United States Patent
Ogawa

(10) Patent No.: US 12,075,200 B2
(45) Date of Patent: Aug. 27, 2024

(54) PROJECTING SYSTEM, PROJECTING METHOD, AND STORAGE MEDIUM

(71) Applicant: CASIO COMPUTER CO., LTD., Tokyo (JP)

(72) Inventor: Masahiro Ogawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 7 days.

(21) Appl. No.: 17/944,781

(22) Filed: Sep. 14, 2022

(65) Prior Publication Data

US 2023/0092862 A1  Mar. 23, 2023

(30) Foreign Application Priority Data

Sep. 17, 2021 (JP) ................................ 2021-152127
Mar. 16, 2022 (JP) ................................ 2022-041139

(51) Int. Cl.
*H04N 9/77* (2006.01)
*H04N 9/31* (2006.01)

(52) U.S. Cl.
CPC .............. *H04N 9/77* (2013.01); *H04N 9/317* (2013.01); *H04N 9/3182* (2013.01)

(58) Field of Classification Search
CPC .......................... G03B 21/142; G03B 21/147; G03B 21/2053; H04N 9/77; H04N 9/317; H04N 9/3182; H04N 9/3185; H04N 9/3188; H04N 9/3194
See application file for complete search history.

(56) References Cited

U.S. PATENT DOCUMENTS

| | | | | |
|---|---|---|---|---|
| 2005/0094110 | A1* | 5/2005 | Nakamura | H04N 21/4318 348/E5.12 |
| 2016/0295185 | A1* | 10/2016 | Mima | H04N 9/3185 |
| 2017/0068153 | A1* | 3/2017 | Ikeura | H04N 9/3185 |
| 2019/0196310 | A1* | 6/2019 | Kimoto | H04N 9/3155 |
| 2020/0099906 | A1* | 3/2020 | Sugisawa | H04N 9/3185 |
| 2020/0177855 | A1* | 6/2020 | Miao | H04N 9/3185 |

FOREIGN PATENT DOCUMENTS

| | | |
|---|---|---|
| JP | 1997-263368 A | 10/1997 |
| JP | 2006-047334 A | 2/2006 |
| JP | 2006-337997 A | 12/2006 |
| JP | 2007-094108 A | 4/2007 |

(Continued)

OTHER PUBLICATIONS

JPO; Application No. 2022-041139; Notice of Reasons for Refusal dated Sep. 5, 2023.

(Continued)

*Primary Examiner* — Sultan Chowdhury
(74) *Attorney, Agent, or Firm* — Fitch, Even, Tabin & Flannery LLP

(57) ABSTRACT

A projecting system includes an image projector that includes an optical source and that projects an image on a projected surface; and a processor. The processor obtains brightness information regarding brightness around the projected surface. The processor selects at least one item among a total luminous flux of the optical source, a color gamut of the image, and a size of the image. The processor adjusts the item that is selected based on the brightness information.

20 Claims, 13 Drawing Sheets

(56) References Cited

FOREIGN PATENT DOCUMENTS

| | | |
|---|---|---|
| JP | 2008-170900 A | 7/2008 |
| JP | 2010-217756 A | 9/2010 |
| JP | 2011-186097 A | 9/2011 |
| JP | 2015-031932 A | 2/2015 |
| JP | 2016-040566 A | 3/2016 |
| JP | 2017-053980 A | 3/2017 |
| JP | 2018-006127 A | 1/2018 |
| WO | 2016/103541 A1 | 6/2016 |
| WO | 2020/031740 A1 | 2/2020 |

OTHER PUBLICATIONS

JPO; Application No. 2022-041139; Notice of Reasons for Refusal dated Feb. 6, 2024.

* cited by examiner

FIG.5

|  | R | G | B |
|---|---|---|---|
| RED LIGHT | ON | OFF | OFF |
| GREEN LIGHT | OFF | ON | OFF |
| BLUE LIGHT | OFF | OFF | ON |

FIG.6

|  | Y | M | RATIO OF AMOUNT OF LIGHT WITH RELATION TO COLOR PRIORITY MODE |
|---|---|---|---|
| RED LIGHT | ON | ON | 3 TIMES |
| GREEN LIGHT | ON | OFF | 2 TIMES |
| BLUE LIGHT | OFF | ON | 1 TIME |

FIG.7

|  | R | Y | M | RATIO OF AMOUNT OF LIGHT WITH RELATION TO COLOR PRIORITY MODE |
|---|---|---|---|---|
| RED LIGHT | ON | ON | ON | 3 TIMES |
| GREEN LIGHT | OFF | ON | OFF | 1 TIME |
| BLUE LIGHT | OFF | OFF | ON | 1 TIME |

FIG.10
| | | WIDE ANGLE | TELEPHOTO |
|---|---|---|---|
| FOCAL DISTANCE (mm) | | 16 | 31 |
| Fno. | | 2.3 | 3.1 |
| SIZE OF IMAGE | | LARGE | SMALL |
| LUMINANCE | CONTRIBUTION OF SIZE OF IMAGE | 1 | 3.75 |
| | CONTRIBUTION OF Fno. | 1 | 0.55 |
| | TOTAL | 1 | 2.07 |
FIG.11
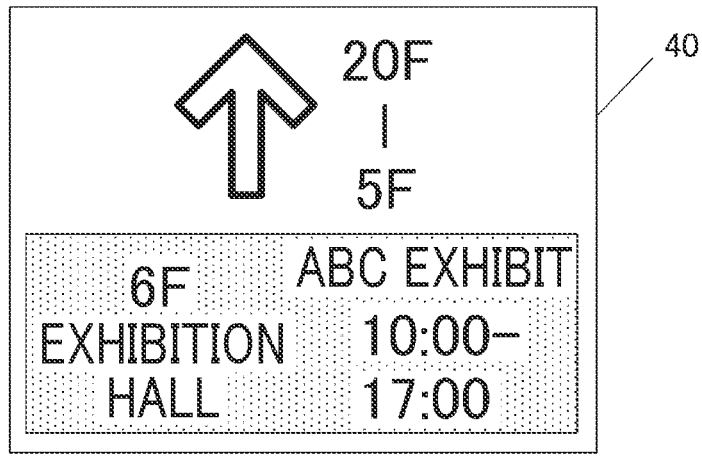
FIG.12
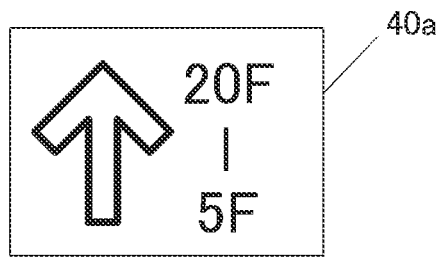

PROJECTING SYSTEM, PROJECTING METHOD, AND STORAGE MEDIUM

CROSS-REFERENCE TO RELATED APPLICATIONS

This application is based upon and claims the benefit of priority under 35 USC 119 of Japanese Patent Application No. 2021-152127, filed on Sep. 17, 2021 and Japanese Patent Application No. 2022-041139, filed on Mar. 16, 2022, the entire disclosure of which, including the description, claims, drawings, and abstract, is incorporated herein by reference in its entirety.

BACKGROUND

1. Field of Invention

The present disclosure relates to a projecting system, projecting method, and storage medium.

2. Description of Related Art

Conventionally, there is a known technique in which a projector is attached and fixed to a ceiling of a building, and an image is projected on a projected surface such as a wall or a floor from the projector. With this, various information is provided to people around the projected surface. For example, JP H9-263368 discloses a technique in which an image including guidance information such as operation status of an elevator is projected on a door of the elevator or a floor from a projector attached to a ceiling of an elevator lobby.

However, there is a problem that if the area around the projected surface becomes brighter, the visibility of the projected image decreases. According to the above conventional techniques, a projected manner such as a projected position of the image and luminance are fixed. Therefore, the conventional techniques cannot appropriately solve the above problems. That is, according to the conventional techniques, there is the problem that an image cannot be projected in an easily visible manner depending on the brightness around the projected surface.

BRIEF SUMMARY OF THE INVENTION

According to one aspect of the disclosure, a projecting system includes: an image projector that includes an optical source and that projects an image on a projected surface; and a processor, wherein the processor obtains brightness information regarding brightness around the projected surface, wherein the processor selects at least one item among a total luminous flux of the optical source, a color gamut of the image, and a size of the image, and wherein the processor adjusts the item that is selected based on the brightness information.

According to another aspect of the disclosure, a projecting method that is performed by a computer in a projecting system including an image projector that includes an optical source and that projects an image on a projected surface, the method includes, obtaining brightness information regarding brightness around the projected surface, selecting at least one item among a total luminous flux of the optical source, a color gamut of the image, and a size of the image, and adjusting the item that is selected based on the brightness information.

According to another aspect of the disclosure, a non-transitory computer readable storage medium having a program stored thereon that can be executed by a processor of a projecting system including an image projector that includes an optical source and that projects an image on a projected surface, wherein the program controls the processor to perform: obtaining brightness information regarding brightness around the projected surface, selecting at least one item among a total luminous flux of the optical source, a color gamut of the image, and a size of the image, and adjusting the item that is selected based on the brightness information.

BRIEF DESCRIPTION OF THE SEVERAL VIEWS OF THE DRAWINGS

FIG. 5 is a diagram describing an operation of the image projector in a color priority mode.

FIG. 6 is a diagram describing an operation of an image projector in a luminance priority mode.

FIG. 7 is a diagram describing another example of an operation of the image projector in the luminance priority mode.

FIG. 10 is a diagram showing a relation between a focal distance of a zoom lens and a projected manner of the image.

FIG. 11 is a diagram showing an example of an image projected through a zoom lens in a wide angle state.

FIG. 12 is a diagram showing an example of a reduced image projected through a zoom lens in a telephoto state.

DETAILED DESCRIPTION OF THE INVENTION

Hereinbelow, embodiments according to the present disclosure are described with reference to the drawings. The purpose of the present disclosure is to provide a projecting system, a projecting method, and a storage medium so as to be able to project an image in a manner that is easily visible.

<Overview of Projecting System>

Figure 1:
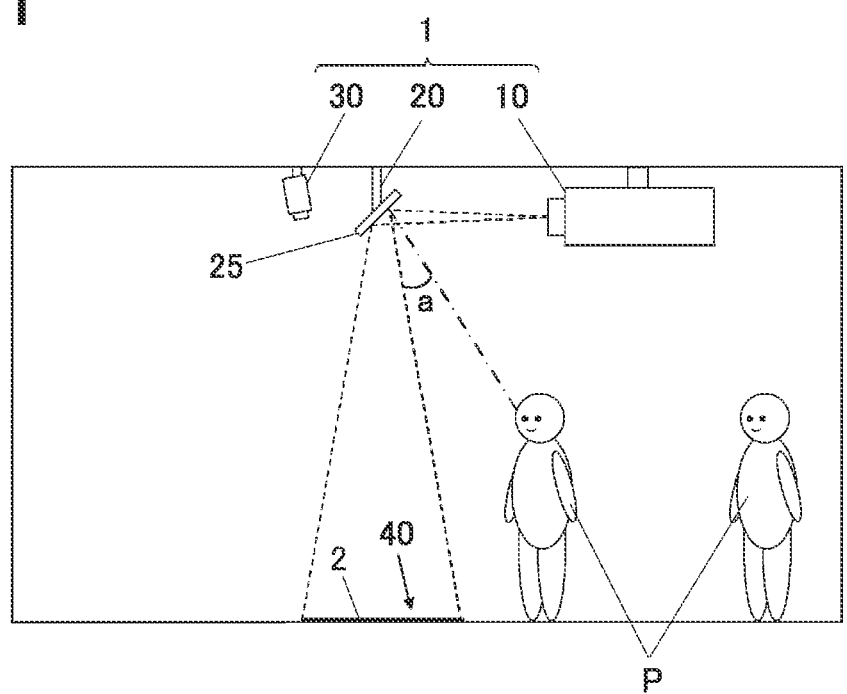
FIG. 1 is a diagram showing a projecting system.

FIG. 1 is a diagram showing a projecting system 1 according to the present embodiment.

The projecting system 1 includes a projector 10, a mirror device 20, and a monitor device 30. The projecting system 1 is provided inside or outside a building such as commercial facilities or public facilities. The projecting system 1 projects an image 40 including information such as guidance of a destination or an operating status of a facility on a projected surface 2. With this, the information is provided to a person P (user of the facility) around the projected surface 2. The projecting system 1 according to the present embodiment is provided in an elevator lobby, and is to project an image 40 to guide a person P waiting for an elevator on a projected surface 2 of a floor. The location where the projecting system 1 is provided is not limited to the above-described facilities and may be provided in a residence, for example. For example, the image 40 including information such as a recipe may be projected on the projected surface 2 by the projecting system 1 provided in a kitchen.

The projector 10 is a projecting apparatus that emits light with an intensity distribution according to image data and with high directivity. With this, the image 40 is projected. The projector 10 is attached to a ceiling or a wall, for example. The manner that the projector 10 is attached is not limited to a manner such as hanging from the ceiling as shown in FIG. 1. For example, a main body of the projector 10 may be embedded in the ceiling or a wall, and the light may be emitted into the room from an opening provided in the ceiling or the wall. Alternatively, the projector 10 may be provided on a stage.

The mirror device 20 includes a mirror 25 that reflects light emitted from the projector 10. The light emitted from the projector 10 is reflected on a mirror 25 and guided to the projected surface 2 so that the image 40 is projected on the projected surface 2. The mirror 25 is provided so that an angle of a surface that reflects the light (hereinafter simply referred to as angle of mirror 25) can be changed. By adjusting the angle of the mirror 25 in the mirror apparatus 20, the position where the image 40 is projected can be adjusted. The mirror device 20 is attached to the ceiling or the wall, for example. The projected surface 2 is a floor surface according to the present embodiment, but is not limited to the above, and may be a wall surface or a predetermined screen. In this specification, the projected surface 2 is to refer to a portion where the image 40 is projected (or is to be projected) on the surface where the image 40 can be projected.

The monitor device 30 generates an imaged image imaging around the projected surface 2, and detects brightness around the projected surface 2. The monitor device 30 is attached to the ceiling or the wall, for example. Environment data (environment information) regarding the environment around the projected surface 2 is obtained from the imaged image generated by the monitor device 30 and a detected result of brightness detected by the monitor device 30. A projected manner of the image 40 is adjusted in the projecting system 1 based on this environment data. The adjusted projecting manner includes at least one of size of the image 40, color gamut of the image 40, and a total luminous flux of a later described optical source 141 of the image projector 14 (see FIG. 3). The adjusted projected manner may further include at least one of a projected position of the image 40 and contents of the image 40. The color gamut 40 described above is a range of color that can be displayed (representable) in the image 40 projected by the projector 10. The total luminous flux of the optical source 141 is the entire luminous flux emitted from the light source 141, and may also be said to be the total amount of light emitted from the optical source 141 for every unit time. For example, the luminance of the image 40 is adjusted by increasing or decreasing the total luminous flux of the optical source 141 according to the brightness around the projected surface 2 so that the image 40 becomes easily visible. The projected position and the size of the image 40 are adjusted according to the position of the person P around the projected surface 2 so that the person P and the image 40 do not overlap. The operation of adjusting the manner that the image 40 is displayed is described in detail later.

<Configuration of Projecting System>

Figure 2:
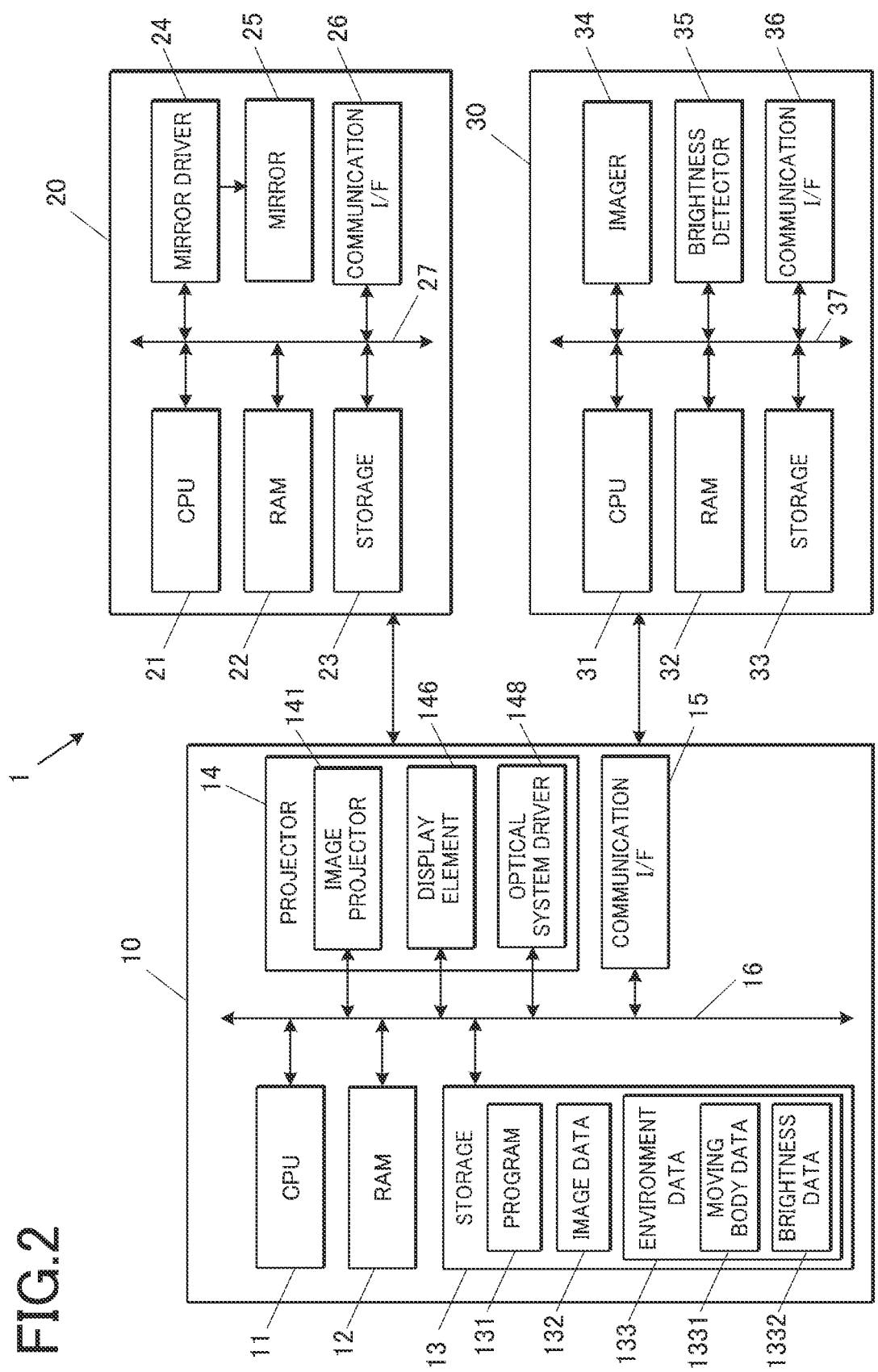
FIG. 2 is a block diagram showing a functional configuration of a projector, a mirror device, and a monitor device.

FIG. 2 is a block diagram showing a functional configuration of the projector 10, the mirror device 20, and the monitor device 30.

The projector 10 includes a CPU (Central Processing Unit) 11, a RAM (Random Access Memory) 12, a storage 13, an image projector 14, a communication I/F (interface) 15, and the like. The above units are connected to each other by a bus 16.

The CPU 11 is a processor that reads and executes a program 131 stored in the storage 13, and performs the various arithmetic processing in order to control the operation of the units in the projector 10, the mirror device 20, and the monitor device 30. The CPU 11 operates the units in the projector 10, the mirror device 20, and the monitor device 30 in order to control the projected manner of the image 40 by the image projector 14. In detail, the CPU 11 obtains the environment information regarding the environment around the projected surface 2 based on the image imaged by the monitor device 30 and the result of the brightness detected by the monitor device 30. Then, the CPU 11 adjusts at least one of the projected position, luminance, size, and contents as the projected manner of the image 40 projected by the image projector 14 based on the obtained environment information. According to the present embodiment, the CPU 11 corresponds to a "processor". Here, the "processor" may include a plurality of CPUs and the plurality of CPUs may perform the plurality of processes executed by the CPU 11 according to the present disclosure. In this case, the plurality of CPUs may be involved in a common process, or the plurality of CPUs may perform different processes individually in parallel.

The RAM 12 provides a working memory space to the CPU 11 and stores temporary data.

The storage 13 is a non-transitory storage medium that is readable by the CPU 11 as the computer. The program 131 and various data are stored in the storage 13. The storage 13 includes a nonvolatile memory such as a flash memory. The program is stored in a form of a computer readable program code in the storage 13. The data stored in the storage 13 includes image data 132 regarding the projected image 40 and environment data 133 (environment information) regarding the environment around the projected surface 2. The environment data 133 includes later described moving body data 1331 and brightness data 1332.

The image projector 14 includes an optical source 141, a display element 146, and an optical system driver 148. The image projector 14 uses the display element 146 to adjust the intensity distribution of the light output from the optical source 141 according to the image data 132. The image projector 14 emits the light through a group of projecting lenses and outside the projector 10 in order to project the image 40.

Figure 3:
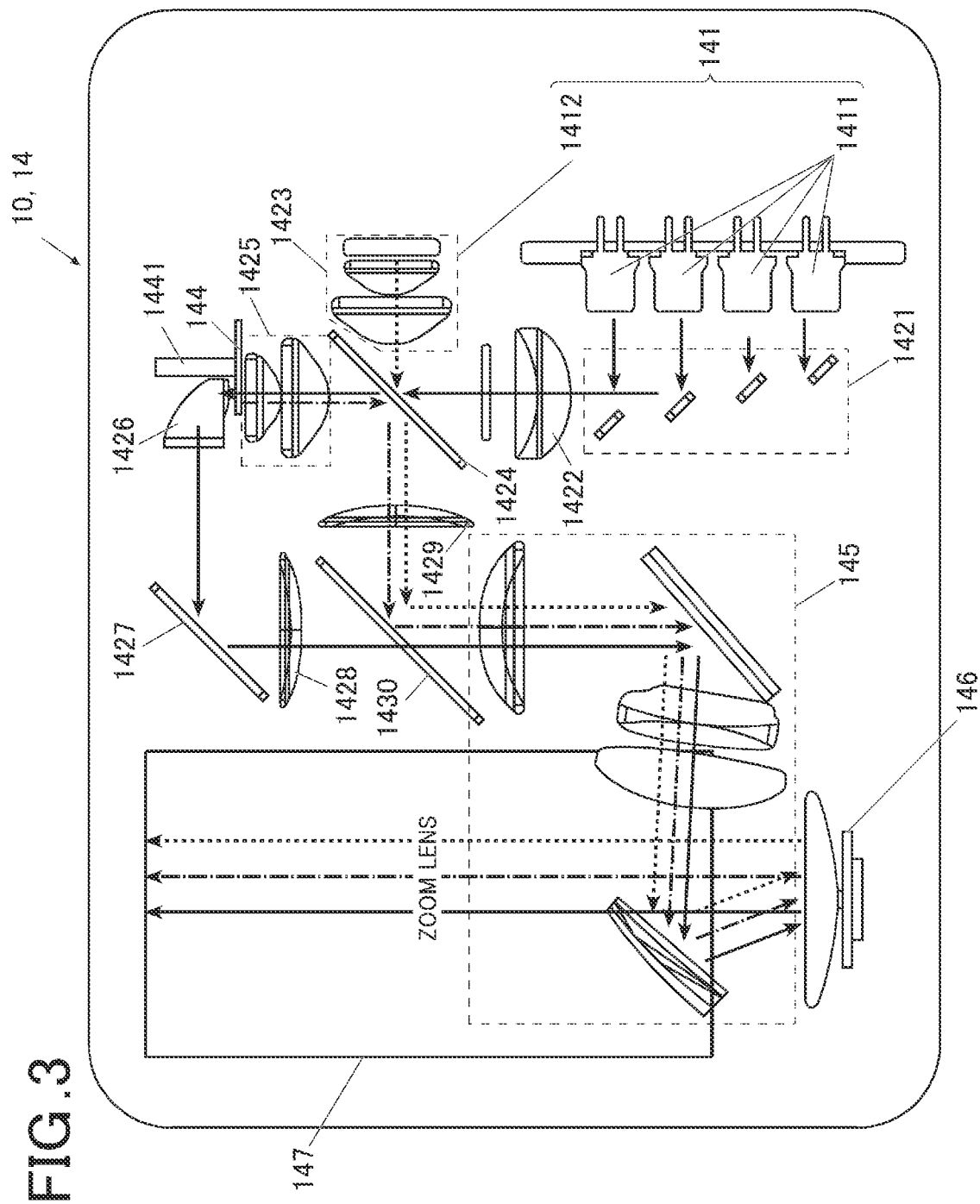
FIG. 3 is a diagram showing an embodiment of an image projector.

FIG. 3 is a diagram showing an embodiment of the image projector 14.

The image projector 14 includes the hybrid type optical source 141 including a laser diode (LD 1411) as a first light emitting element and a light emitting diode (LED 1412) as a second light emitting element. The image projector 14 uses the LD 1411 and the LED 1412 as the optical source in order to emit RGB light. The LD 1411 emits light in a blue wavelength band (hereinafter referred to as "blue light"). Here, for example, 4 TO-CAN type LD 1411 are aligned and emit light in parallel. The LED 1412 emits light in a red wavelength band (hereinafter referred to as "red light"). The light in a green wavelength band (hereinafter referred to as "green light") is obtained by emitting blue light to a phosphor layer of the phosphor wheel 144. FIG. 3 shows an optical path of the blue light with solid lines, an optical path of the green light with short and long dash lines, and an optical path of the red light with dotted lines. The total luminous flux of the optical source 141 can be adjusted by increasing or decreasing driving electric currents supplied to the LD 1411 and the LED 1412. The adjustment of the total luminous flux of the optical source 141 is performed according to control by the CPU 11.

Various optical devices are positioned on the optical path. Here, the optical device includes a reflecting mirror group 1421, condenser lenses 1422, 1423, 1428, and 1429, a condenser lens group 1425, dichroic filters 1424 and 1430, a deformed lens 1426, and a reflecting mirror 1427. The phosphor wheel 144 that rotates by the motor 1441 is positioned on the light path of the blue light.

A portion of the blue light that is incident on the phosphor wheel 144 is transmitted through the phosphor wheel 144. Another portion of the blue light is irradiated on a phosphor layer of the phosphor wheel 144, and the green light excited in response to the irradiation travels in the direction including the component in the direction opposite to the direction that the blue light travels.

The blue light that transmits through the phosphor wheel 144 is incident on the deformed lens 1426, and further passes the reflecting mirror 1427, the condenser lens 1428, and the dichroic filter 1430. Then, the blue light is guided to a merging light guide 145.

The green light that is emitted from the phosphor layer of the phosphor wheel 144 returns to the condenser lens group 1425. After the green light is reflected by the dichroic filter 1424 and is transmitted through the condenser lens 1429, the green light is reflected by the dichroic filter 1430 and is guided to the merging light guide 145.

Diffusion of the red light emitted from the LED 1412 is narrowed with the condenser lens 1423 and the red light passes the dichroic filter 1424. Then, the red light is reflected with the dichroic filter 1430 and is guided to the merging light guide 145.

After the light of the 3 colors are combined (merged) by the dichroic filter 1430, the light passes the merging light guide 145, the display element 146, and the zoom lens 147, and then the light is emitted. The merging light guide 145 reflects the light in which the parallel light of the colors are combined and guides the light to the display element 146 in a suitable direction.

The display element 146 is a spatial optical modulator (SOM) and may be a digital micro-mirror element (DMD, digital micro-mirror device), for example. The DMD switches a tilt angle of each of the plurality of micro-mirrors arranged in an array at a high speed according to the pixel value of the image data 132. By determining the light reflection to the zoom lens 147 in a unit of each pixel in each image frame, a light image is formed by the reflected light. The total luminous flux of the optical source 141 does not have to be incident on the display element 146. The image 40 is projected by the luminous flux that is incident on the display element 146 among the total luminous flux of the optical source 141.

The zoom lens 147 guides the light image emitted from the display element 146 in a predetermined output direction and emits the light image. The zoom lens 147 includes a plurality of lenses. By changing the relation of the positions of the plurality of lenses, a focal distance and magnification ratio (zoom magnification) of the output image can be adjusted.

In response to control signals transmitted from the CPU 11, the optical system driver 148 (FIG. 2) moves the plurality of lenses included in the zoom lens 147 and adjusts the focal distance and the zoom magnification of the zoom lens 147. The optical system driver 148 includes an actuator that moves each of the plurality of lenses in an optical axis direction. The optical system driver 148 moves the actuator in response to the control signals transmitted from the CPU 11. With this, the relation of the positions of the plurality of lenses changes with relation to the light axis direction, and the focal distance and the zoom magnification of the zoom lens 147 are adjusted.

Here, the configuration of the phosphor wheel 144 is described.

Figure 4:
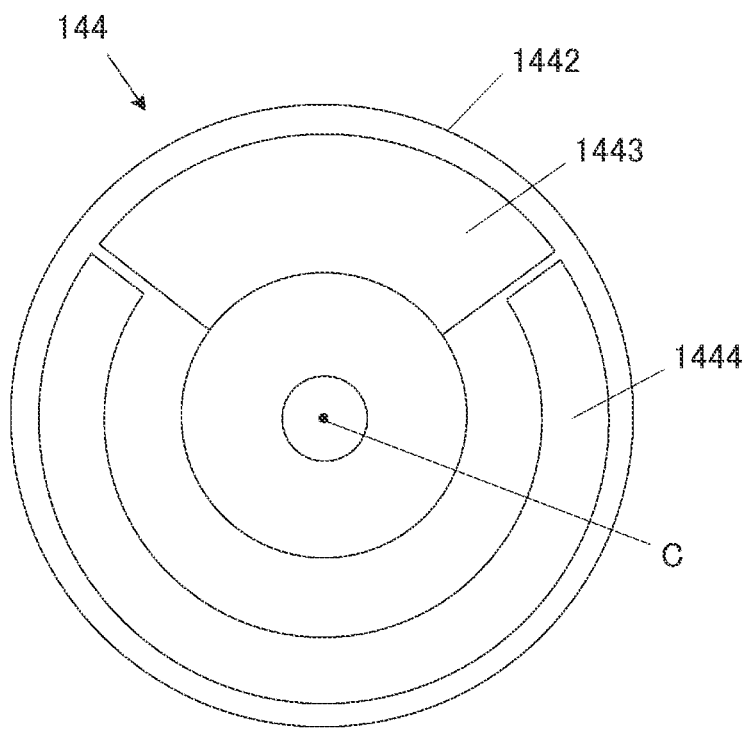
FIG. 4 is a diagram showing a configuration of a phosphor wheel.

FIG. 4 is a diagram describing the configuration of the phosphor wheel 144.

The phosphor wheel 144 includes a wheel plate 1442 which is a disk-shaped metal plate and a phosphor layer 1444 which is layered on the wheel plate 1442. An opening 1443 that transmits light is provided in the wheel plate 1442 in a range of about ⅓ of the circumferential direction of the phosphor wheel 144. The opening 1443 may be provided with a light transmitting material in order to diffuse the transmitted light. A phosphor layer 1444 is provided in the wheel plate 1442 in a range of about ⅔ of the circumferential direction of the phosphor wheel 144, and in the range other than the range that the opening 1443 is formed. The range that the opening 1443 is formed does not have to be ⅓ in the circumferential direction and may be about ¼, for example. In this case, the phosphor layer 1444 may be provided in the range of about ¾ that remains.

The phosphor wheel 144 is driven by the motor 1441 and rotates around a rotating axis that passes through a center C and that is perpendicular to the wheel plate 1442. In the rotating cycle of the phosphor wheel 144, the blue light transmits through the opening 1443 during the period that the opening 1443 is positioned on the light path of the blue light. In the rotating cycle, during the period that the phosphor layer 1444 is positioned on the light path of the blue light, the green light is excited based on the blue light, and the green light travels in the direction including the component in the direction opposite to the travelling direction of the blue light. According to the configuration shown in FIG. 4, the green light is excited during the period of ⅔ of the rotating cycle of the phosphor wheel 144. The period that the excited green light is guided to the display element 146 can be adjusted. The method of adjustment is not limited, and the method may be to stop light emission of the LD 1411 in a part of the period that the phosphor layer 1444 is positioned on the light path of the blue light, for example.

The green light may be incident on the display element 146 in half of the period that the green light is excited (period that is ⅔ of the rotating cycle) (that is, the green light generated by using ⅓ of the phosphor wheel 144 may be incident on the display element 146), and the red light may be incident on the display element 146 in the remaining half of the period (period that is ⅓ of the rotating cycle of the phosphor wheel 144). With this, each of the red light, the green light, and the blue light can be incident on the display element 146 in order in the period that is ⅓ of the rotating cycle. As described above, the projector 10 according to the present embodiment projects the image by a field sequential method that irradiates the display element 146 with the red light, green light and the blue light in a time divisional manner.

Here, the operation mode of the image projector 14 is described. In the image projector 14, the operation mode can be switched between a color priority mode (first mode) that puts priority on a wide color gamut (color reproducibility) of the projected image 40, and a luminance priority mode (second mode) that sets a maximum value of the luminance of the image 40 to be higher than the color priority mode. In the color priority mode, light of one color among the red light, green light, and the blue light (light of 3 colors) is used at any point during projection of the image 40. In the luminance priority mode, by using 2 colors of light among the red light, green light and the blue light at the same time during at least part of the period during the projection of the image 40, the maximum value of the luminance of the image 40 is increased more than the color priority mode. On the other hand, in the luminance priority mode, the color gamut that can be displayed becomes narrower than the color priority mode. The switching between the operation modes of the image projector 14 is performed by the CPU 11.

FIG. 5 is a diagram that describes the operation of the image projector 14 in the color priority mode.

The 3 columns in the table shown in FIG. 5 represent a display period of a specific color in the field sequential display operation. In the color priority mode, an R period in which only the red light is used for display, a G period in which only the green light is used for display, and a B period in which only the blue light is used for display are repeated. With this, the image 40 is formed. In the R period, the red light is used for display (ON), and the green light and the blue light are not used (OFF). In the G period, the green light is used for display (ON), and the red light and the blue light are not used (OFF). In the B period, the blue light is used for display (ON), and the red light and the green light are not used (OFF). In the color priority mode, as described above, ⅓ of the phosphor wheel 144 (½ of the phosphor layer 1444) is used to generate the green light, and the green light is incident on the display element 146.

FIG. 6 is a diagram describing the operation of the image projector 14 in the luminance priority mode.

In the luminance priority mode shown in FIG. 6, a Y period in which a yellow light obtained by overlapping the red light and the green light is used for display and a M period in which a magenta light obtained by overlapping the red light and the blue light is used for display are repeated to form the image 40. In the Y period, the red light and the green light are used for display (ON), and the blue light is not used (OFF). In the M period, the red light and the blue light are used for display (ON) and the green light is not used (OFF). In the luminous priority mode, in order to obtain a higher luminance, ⅔ of the phosphor wheel 144 (entire phosphor layer 1444) is used to generate the green light and the light is incident on the display element 146. That is, duty ratio of the Y period (percentage that the Y period occupies the projected period of the image 40) is ⅔, and the duty ratio of the M period is ⅓.

In the luminance priority mode shown in FIG. 6, the red light is used in the entire period. Therefore, the amount of red light is 3 times that of the color priority mode.

Moreover, in the luminance priority mode shown in FIG. 6, the duty ratio of the Y period (⅔) using the green light is 2 times that of the duty ratio (⅓) of the period of use of the green light in the color priority mode. Therefore, the amount of green light in the luminance priority mode shown in FIG. 6 is 2 times that of the color priority mode.

In the luminance priority mode shown in FIG. 6, the duty ratio of the M period (⅓) using the blue light is the same as the duty ratio (⅓) of the period of use of the blue light in the color priority mode. Therefore, the amount of light of the blue light is the same as the color priority mode.

As described above, in the luminance priority mode shown in FIG. 6, the color gamut that can be displayed becomes narrower than that of the color priority mode due to the color that can be displayed being limited to the color obtained by overlapping yellow and magenta. On the other hand, the amount of light of the red light and green light increases. Therefore, the maximum value of the luminance can be increased more than the color priority mode. That is, according to the projecting system 1 of the present embodiment, there is a negative correlation between the wideness of the color gamut that can be displayed and the luminance of the image 40.

In the luminance priority mode, 2 colors of light among the red light, green light, and the blue light are to be used at the same time in at least a part of the period during the projection of the image 40, and the operation is not limited to the operation as shown in FIG. 6.

FIG. 7 is a diagram describing another example of the operation of the image projector 14 in the luminance priority mode.

In the luminance priority mode shown in FIG. 7, a R period in which only the red light is used for display, a Y period in which the yellow light combining the red light and the green light is used for display and a M period in which the magenta light combining the red light and the blue light is used for display are repeated to form the image 40. In the luminance priority mode shown in FIG. 7, ⅓ of the phosphor wheel 144 (half of the phosphor layer 1444) is used to generate the green light and the light is incident on the display element 146.

In the luminance priority mode shown in FIG. 7, the red light is used in the entire period. Therefore, the amount of light of the red light is 3 times that of the color priority mode.

In the luminance priority mode shown in FIG. 7, the duty ratio (⅓) of the Y period using the green color is the same as the duty ratio (⅓) of the period that the green color is used in the color priority mode. Therefore, the amount of light of the green light is the same as the color priority mode.

In the luminance priority mode shown in FIG. 7, the duty ratio (⅓) of the M period using the blue light is the same as the duty ratio (⅓) of the period that used the blue light in the color priority mode. Therefore, the amount of light of the blue light is the same as the color priority mode.

In the luminance priority mode shown in FIG. 7, the color obtained by overlapping red, yellow, and magenta can be displayed. Therefore, the color gamut of the image 40 is narrower than the color priority mode and wider than the luminance priority mode shown in FIG. 6. Since the amount of light of the red light increases, the maximum value of the luminance is lower compared to the luminance priority mode shown in FIG. 6, and larger than the color priority mode.

As described above, by switching the operation mode of the image projector 14 between the color priority mode and the luminance priority mode, the color gamut that can be displayed can be changed and with this, the luminance of the image 40 can be adjusted.

Returning to FIG. 2, the communication I/F 15 (communication interface) performs transmitting and receiving of data with the mirror device 20 and the monitor device 30, and may be any or a combination of various serial interfaces, and various parallel interfaces, for example. The projector 10 may include a communicator that performs data communication with external devices other than the mirror device 20 and the monitor device 30.

The mirror device 20 includes a CPU 21, a RAM 22, a storage 23, a mirror driver 24, a mirror 25, and a communication I/F (interface) 26. The above units are connected to each other by a bus 27.

The CPU 21 is a processor that reads and executes a program stored in the storage 23 based on control signals transmitted from the CPU 11 of the projector 10, and performs the various arithmetic processing in order to control the operation of the units in the mirror device 20.

The RAM 22 provides a working memory space to the CPU 21 and stores temporary data.

The storage 23 is a non-transitory storage medium that is readable by the CPU 21 as the computer. The program and various data are stored in the storage 23.

The mirror driver 24 includes a mirror driving motor (not shown), and operates the mirror driving motor based on the control signal transmitted from the CPU 21 to change the angle of the mirror 25. Examples of the mirror driving motor includes, motors that can control the position such as servomotors, stepping motors, and the like. The mirror driver 24 and the mirror 25 may be a galvanometer mirror, for example.

The communication I/F 26 performs transmitting and receiving of data with the projector 10, and may be any or a combination of various serial interfaces, and various parallel interfaces, for example.

The monitor device 30 includes a CPU 31, a RAM 32, a storage 33, an imager 34, a brightness detector 35, and a communication I/F (interface) 36. The above units are connected to each other by a bus 37.

The CPU 31 is a processor that reads and executes a program stored in the storage 33 based on control signals transmitted from the CPU 11 of the projector 10, and performs the various arithmetic processing in order to control the operation of the units in the mirror device 30.

The RAM 32 provides a working memory space to the CPU 31 and stores temporary data.

The storage 33 is a non-transitory storage medium that is readable by the CPU 31 as the computer. The program and various data are stored in the storage 3.

The imager 34 is a camera including a plurality of imaging elements that convert the incident light to electric signals according to the strength of the light, and an optical system that guides the incident light to the imaging element. The imager 34 is able to image moving images in addition to still images or instead of still images. The imager 34 images an imaging range determined by the imaging element and the optical system under the control by the CPU 31, and generates imaged image data. The data is stored in the storage 33.

The brightness detector 35 detects the brightness around the projected surface 2, and the detected result is output to the CPU 31. The brightness detector 35 includes an optical element that outputs the electric signal according to the strength of the incident light, examples including, a photodiode, a phototransistor, or the like. When it is possible to obtain the information of the brightness around the projected surface 2 at a desired accuracy from the image imaged by the imager 34, the brightness detector 35 can be omitted.

The communication I/F 36 performs transmitting and receiving of data with the projector 10, and may be any or a combination of various serial interfaces, and various parallel interfaces, for example.

<Operation of Projecting System>

Next, the operation of the projecting system 1 is described.

In the projecting system 1, in parallel with the projection of the image 40 by the projector 10, periodically or in real time, the imaging and the detection of the brightness are performed by the monitor device 30. From the image imaged by the monitor device 30, it is possible to obtain information regarding a position of the person P around the projected surface 2 (relation of positions between image 40 and person P), direction that a face of the person P is facing, and a number of people P (hereinafter referred to as "moving body information"). The person P is one form of the "moving body". The obtained moving body information is stored as moving body data 1331 in the storage 13 of the projector 10. From the detection result of the brightness detected by the monitor device 30, information regarding the brightness around the projected surface 2 (hereinafter referred to as "brightness information") can be obtained. The obtained brightness information is stored in the storage 13 of the projector 10 as brightness data 1332. The moving body information and the brightness information are one form of the "environment information" related to an environment around the projected surface 2. Here, the range of "around the projected surface 2" can be suitably determined and may be a range where the image 40 is visible or may be a range within a predetermined distance from the image 40, for example. Alternatively, the range may be within a range that can be imaged (within the range of the angle of view) by the imager 34 of the monitor device 30 when the projected surface 2 is imaged so that the image 40 comes to the center.

In the projecting system 1, the projected manner that the image 40 is projected (projected position, luminance, size, contents, etc. of the image 40) is adjusted based on the moving body data 1331 and the brightness data 1332. Hereinafter, the adjustment operation of the projected manner of the image 40 is described below.

(Adjustment of Projected Manner of Image Based on Moving Body)

When the moving body information is obtained and the moving body data 1331 is generated, based on the moving body data 1331, it is determined whether the relation of the positions between the image 40 and the person P satisfies a predetermined suitable condition. According to the present embodiment, when the image 40 and the person P overlap or the distance between the image 40 and the person P is less than a predetermined standard distance, it is determined that the suitable condition is not satisfied. This is an example, and the suitable condition can be suitably determined according to a purpose of use of the image 40.

Figure 8:
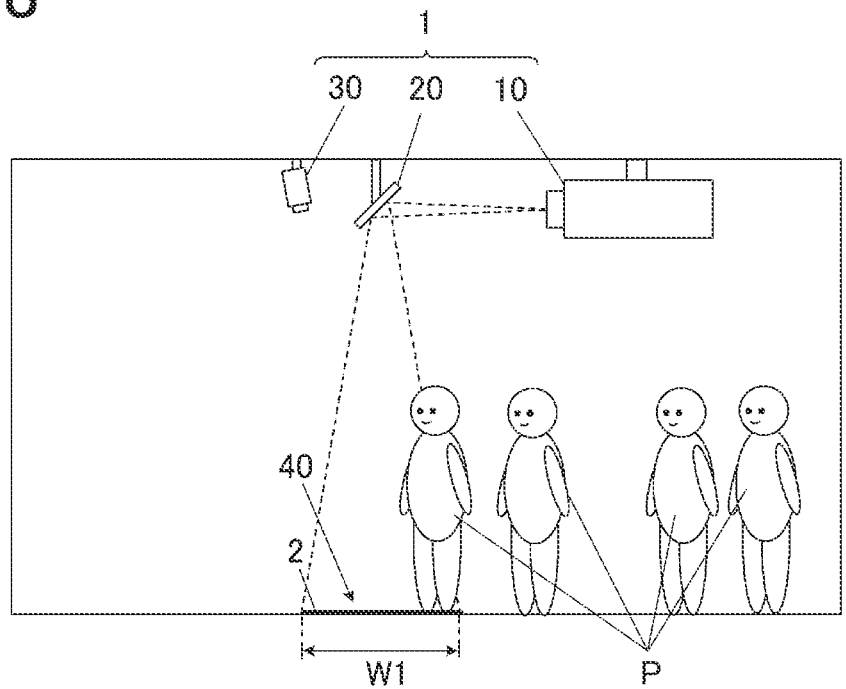
FIG. 8 is a diagram showing an example when a relation of positions between a person and an image does not satisfy suitable conditions.

FIG. 8 is a diagram showing an example when the relation of positions between the person P and the image 40 does not satisfy the suitable condition. In the state shown in FIG. 8, since the person P is overlapped with the image 40, it is determined that the suitable condition is not satisfied. When the image 40 and the person P are overlapped as shown in FIG. 8, a portion of the image 40 is not visible. Even if the image 40 and the person P do not overlap, when the distance between the image 40 and the person P is less than the standard distance, the image 40 and the person P easily overlap by the person P moving. Therefore, when it is determined that the suitable condition regarding the relation of the positions between the person P and the image 40 is not satisfied, at least one of the position and the size of the image 40 is adjusted so that the suitable condition is satisfied. The procedure to adjust the position and the size of the image 40 is not limited as long as the suitable conditions are satisfied after adjustment. An example of the adjustment procedure of the position and the size of the image 40 is shown below.

For example, when the suitable condition can be satisfied by adjusting the position of the image 40, the projected position of the image 40 is adjusted by changing the angle of the mirror 25 of the mirror device 20. That is, the angle of the mirror 25 is changed so that the shortest distance between the image 40 and the person P around the projected surface 2 increases (shortest distance becomes a distance equal to or larger than a standard distance). With this, the projected position of the image 40 is adjusted. When the projected position is adjusted, trapezoidal correction of the image 40 can be performed by known methods.

Figure 9:
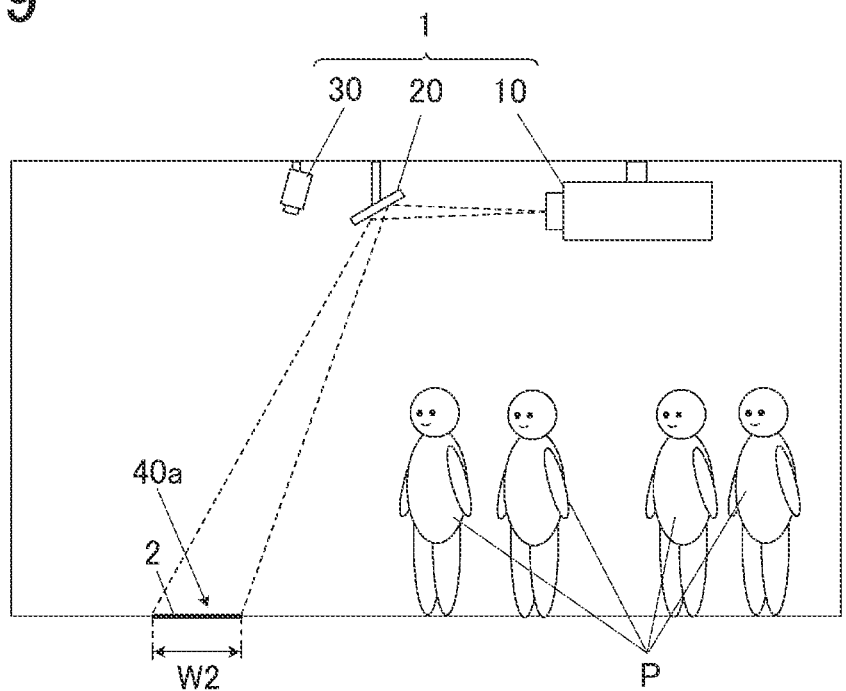
FIG. 9 is a diagram showing an example of a state in which a projected position and size of the image are changed.

When the suitable condition cannot be satisfied by only the position adjustment of the image 40, the suitable condition can be satisfied by adjusting the projected position of the image 40 in addition to reducing the size of the image 40. That is, the size of the image 40 may be adjusted (made smaller) so that the shortest distance between the image 40 and the person P around the projected surface 2 increases (shortest distance becomes a distance equal to or larger than a standard distance). FIG. 9 is a diagram showing an example of a state in which the projected position and the size of the image 40 is changed. In detail, FIG. 9 adjusts the projected position of the image 40 from the state shown in FIG. 8, and shows the width W2 of the image 40 to be smaller than the width W1 before reduction. Hereinbelow, the image 40 after reduction is also shown as reduced image 40a.

The reduction of the image 40 is performed by increasing the zoom magnification by the zoom lens 147 with the optical system driver 148 of the projector 10 (by control of increasing the focal distance of the zoom lens 147).

FIG. 10 is a diagram showing a relation between the focal distance of the zoom lens 147 and the projected manner of the image 40.

FIG. 10 shows "Fno." of the zoom lens 147, "size of the image 40", and the "luminance (brightness for each unit area)" of the image 40 in a "wide angle state" with the focal distance of the zoom lens 147 set to 16 mm and a "telephoto state" with the focal distance set to 31 mm. Among the above, "Fno." is a value dividing the focal distance of the zoom lens 147 by an incident pupil diameter, and the more the value becomes smaller, the brighter the lens is. The luminance is a relative value showing the luminance of the image 40 in the telephoto state when the luminance in the wide angle state is set to be "1".

As shown in the row of the "size of the image" in FIG. 10, by changing from the "wide angle state" to the "telephoto state", the angle of view of the image 40 becomes small and the size of the image 40 becomes small according to the change in the angle of view.

As shown in the bottom row of FIG. 10, the luminance of the image 40 in the telephoto state increases to 2.07 times the luminance of the image 40 in the wide angle state. The increase rate in the luminance is the value multiplying contribution of the size of the image reducing (3.75 times) by the contribution of the Fno. of the zoom lens 147 increasing (0.55 times). Among the above, the contribution by the image size reducing is derived from the square of the rate of change in the focal distance (=(31/16)2). Moreover, the contribution of the increase in the Fno. of the zoom lens 147 is derived from the square of the inverse of the rate of change of the Fno. (=(2.3/3.1)2).

As described above, by increasing the focal distance of the zoom lens 147 (zoom magnification) and reducing the image 40, the size of the image 40 can be reduced and the luminance of the image 40 can be increased. The suitable conditions can be satisfied by reducing the size of the image 40 without performing the adjustment of the projected position of the image 40.

When the image 40 is reduced, it is difficult to view the information included in the image 40. In response to the reduction of the image 40, the contents of the image 40 can be changed so that the amount of information included in the image 40 is reduced. Here, for example, the amount of information included in the image 40 becomes smaller as the number of letters included in the image 40 becomes smaller, as the number of colors in the image 40 becomes smaller (or the number of tones of the pixels in the image becomes smaller), and as the number of photographs (or data amount) included in the image 40 becomes smaller.

FIG. 11 is a diagram showing an example of an image 40 projected through a zoom lens 147 in a wide angle state.

FIG. 12 is a diagram showing an example of a reduced image 40a projected through a zoom lens 147 in a telephoto state.

The image 40 in the wide angle state shown in FIG. 11 is for guiding the person P waiting for the elevator in the elevator lobby, and includes a display that the elevator going up to the 5th floor to the 20th floor is coming, and a display of a guide showing an "ABC Exhibit" held on the 6th floor.

On the other hand, the reduced image 40a shown in FIG. 12 is an image after adjustment to reduce the size of the image 40 shown in FIG. 11. The display of the guide showing the "ABC Exhibit" is omitted in the reduced image 40a shown in FIG. 12 and only the display showing that the elevator going up to the 5th floor to the 20th floor is coming is included. By reducing the amount of the information included in the image 40 in response to the reduction of the image 40 as described above, even if the size of the image 40 is reduced, the information can be easily read.

The image 40 shown in FIG. 11 and FIG. 12 is merely an example, and the contents in the image 40 is not limited to the above. For example, in the image 40 before enlarging, a color photograph or a color illustration may be included. When the image 40 is reduced and the reduced image 40a is displayed, the color photograph and the color illustration may be deleted. When the color photograph or the color illustration is included in the image 40 before enlarging, it is preferable to project the image 40 in the color priority mode. When the color photograph and the color illustration are deleted in the reduced image 40a, in order to display the reduced image 40a, the operation mode of the image projector 14 may be switched from the color priority mode to the luminance priority mode. With this, the luminance of the reduced image 40a can be increased without an unusual impression of the displayed colors in the image 40 and the reduced image 40a. Alternatively, the reduced image 40a may include only text information and black and white images (black and white icons, etc.). Alternatively, the color priority mode or the luminance priority mode may be selected based on the contents of the image 40. For example, the information specifying the operation mode of the image projector 14 may be linked in advance with the image data, and the CPU 11 may select the operation mode based on the information regarding the operation mode linked to the image data. Specifically, the image 40 to notify simple information such as the destination of the elevator may be linked with information specifying the luminance priority mode, and the image 40 may be projected in the luminance priority mode from the start of projection of the image 40.

According to the above, the projected manner of the image 40 is adjusted based on the position of the person P (relation of the positions of the person P and the image 40). However, the adjustment is not limited to the above, and the projected manner of the image 40 may be adjusted based on the information regarding the number of people P in the moving body information. For example, as the number of people P around the projected surface 2 becomes larger, the possibility that the suitable conditions regarding the relation of the positions between the person P and the image 40 are not satisfied increases. Therefore, depending on the number of people P, at least one of the size and/or the position of the image 40 may be adjusted. For example, even if the suitable condition can be satisfied only by adjusting the projected position of the image 40, it may be set so that when the number of people P is equal to or larger than a predetermined reference number, the size of the image 40 is reduced to a predetermined reference size or smaller according to the number of people P. The reference size is set in advance and stored in the storage 13. The reference size may be derived each time by a function that uses the number of people P as a variable, or the reference size may be stored associated in advance to each number of people P.

When the information regarding the direction that the face of the person P is facing is included in the moving body data 1331, the projected manner of the image 40 may be adjusted based on the information. The direction that the face is facing can be specified by performing a well-known image analysis process that recognizes the face on the image imaged by the monitor device 30. For example, as shown in FIG. 1, when the person P facing the image 40 is detected around the projected surface 2, at least one of the projected position and size of the image 40 may be adjusted to increase a smallest angle a formed by a travelling direction of the light included in the image 40 and the direction toward the face of the person P. Here, the travelling direction of the light included in the image 40 is the direction of the line connecting the position that the light is reflected on the mirror 25 and the image 40 when the image 40 consists of light reflected by the mirror 25 as shown in FIG. 1. The direction toward the face of the person P is the direction of the line connecting the position that the light is reflected on the mirror 25 and the face of the person P when the image 40 consists of light reflected by the mirror 25 as shown in FIG. 1. By increasing the smallest angle a formed by the travelling direction of the light included in the image 40 and the direction toward the face of the person P, the brightness felt by the person P can be reduced.

(Adjustment of Projected Manner of Image Based on Brightness Information)

Next, the adjustment operation of the projected manner of the image based on the brightness information is described.

When the brightness around the projected surface 2 increases in a state that the luminance of the projected image 40 is constant, the visibility of the image 40 decreases relatively. Therefore, when the brightness information is obtained based on the detected result detected by the monitor apparatus 30 and the brightness data 1332 is generated, based on the brightness data 1332, it is determined whether the luminance of the image 40 is equal to or brighter than a suitable luminance according to the brightness around the projected surface 2. When it is determined that the luminance of the image 40 is less than the suitable luminance, adjustment is performed to increase the luminance of the image 40. That is, the luminance of the image is adjusted so that the luminance of the image 40 becomes high as the brightness around the projected surface 2 specified from the brightness information increases.

The suitable luminance is set in advance according to the brightness around the projected surface 2 and stored in the storage 13. The suitable luminance can be derived each time by a function that uses the surrounding brightness as a variable. The suitable luminance may also be stored corresponded in advance according to the level of brightness showing the brightness of the surroundings.

The following three methods are examples to increase the brightness of the image 40.

The first method is a method to increase the total luminous flux of the optical source 141 by increasing the electric power supplied to the optical source 141 (driving current flown in the LD 1411 and the LED 1412). By increasing the total luminous flux of the optical source 141, the luminous flux incident in the display element 146 can be increased. With this, the luminance of the light image formed by the light reflected from the display element 146 is increased and the luminance of the projected image 40 increases.

The second method is the method to increase the focal distance of the zoom lens 147 and to reduce the image 40. As described with reference to FIG. 10, by reducing the image 40, the luminance of the image 40 increases.

The third method is the method to switch the operation mode of the image projector 14 from the color priority mode to the luminance priority mode. As described above, when the display mode of the image projector 14 is switched, the color gamut that can be displayed changes. The luminance of the image 40 changes so as to decrease as the color gamut increases.

Two or more methods among the first to third methods can be combined.

When the brightness of the image 40 is reduced, the control opposite to the above can be performed.

(Image Projecting Process)

Next, the control procedure of the image projecting process including the adjustment process of the projected manner of the image 40 is described.

Figure 13:
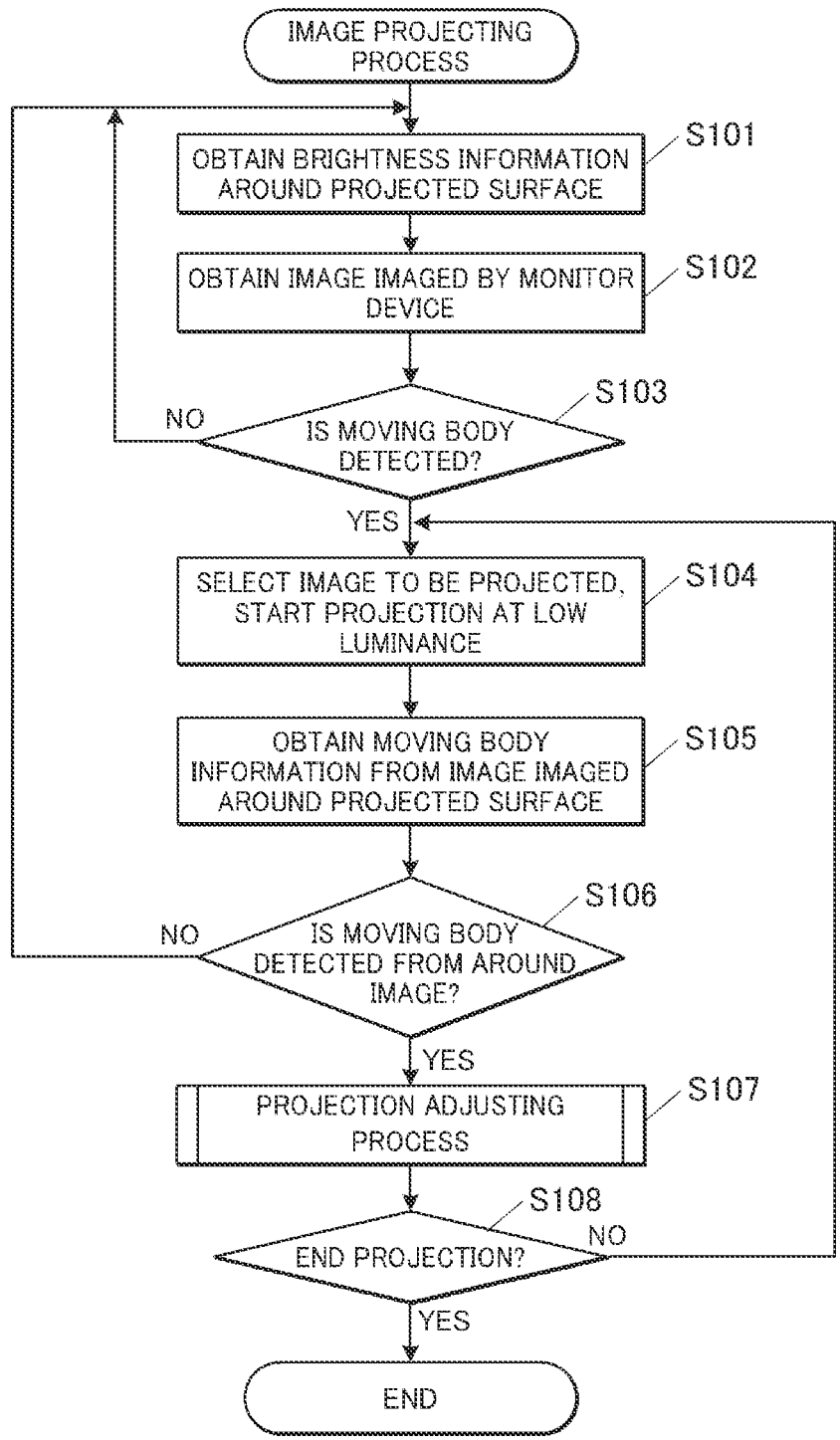
FIG. 13 is a flowchart describing a control procedure of an image projecting process.

FIG. 13 is a flowchart describing the control procedure of the image projecting process.

The image projecting process is performed when the projection of the image 40 by the projecting system 1 is started.

When the image projecting process is started, the CPU 11 of the projector 10 transmits the control signal to the monitor device 30, and the detection of the brightness by the brightness detector 35 is performed. Then, the CPU 11 obtains the detected result detected by the brightness detector 35, and obtains the brightness information related to the brightness around the projected surface 2 (step S101). The CPU 11 also stores the brightness data 1332 including the brightness information in the storage 13.

The CPU 11 transmits the control signal to the monitor device 30 to control the imager 34 to perform the imaging, and the CPU 11 obtains the imaged image from the monitor device 30 (step S102). In detail, the CPU 11 adjusts sensitivity of the imager 34 based on the brightness data 1332 generated in step S101, and images the area around the position where the image 40 is to be projected.

The CPU 11 performs the image analysis on the obtained imaged image, and determines whether the person P as the moving body is detected in the imaged image (step S103).

When it is determined that the person P is not detected ("NO" in step S103), the process returns to step S101.

On the other hand, when it is determined that the person P is detected ("YES" in step S103), the CPU 11 selects the projected image 40, the image projector 14 is operated based on the image data 132 of the selected image 40, and the projection of the image 40 with the predetermined initial luminance is started (step S104).

The initial luminance is determined in advance, and the luminance is sufficiently low so that the person P does not feel that it is too bright when the image 40 is overlapped with the person P. The imaged image obtained in step S102 is the image before starting the projection of the image 40. Therefore, it is not possible to accurately predict from such image the relation of the positions between the image 40 and the person P when the projection of the image 40 actually starts. In view of the above, since there is a possibility that the image 40 overlaps with the person P when the projection is started in step S104, it is preferable that the luminance of the image 40 is suppressed in advance so that the person P does not feel that it is bright. In step S104, the CPU 11 operates the image projector 14 in the color priority mode and projects the image 40. As described above, according to an embodiment, the image 40 may be projected with the luminance priority mode from the start of projection based on the image data, etc. Depending on the status of the environment around the projected surface 2, the reduced image 40a with the information amount reduced from the beginning may be projected.

The CPU 11 transmits the control signal to the monitor device 30 and controls the imager 34 to perform the imaging. With this, the imaged image is obtained from the monitor device 30. Then, the CPU 11 performs the image analysis on the obtained imaged image, and obtains the moving body information including the information regarding the person P around the projected surface 2 (step S105). The CPU 11 generates the moving body data 1331 including the obtained moving body information and stores the moving body data 1331 in the storage 13.

The CPU 11 determines whether the person P as the moving body is detected around the image 40 (projected surface 2) based on the obtained imaged image and the moving body data 1331 (step S106). When it is determined that the person P is not detected ("NO" in step S106), the process returns to step S101. Here, since there are no people P viewing the image 40 around the projected surface 2, the projection of the image 40 may be paused.

When it is determined that the person P is detected around the image 40 (projected surface 2) ("YES" in step S106), the CPU 11 performs the projection adjusting process (step S107).

Figure 14:
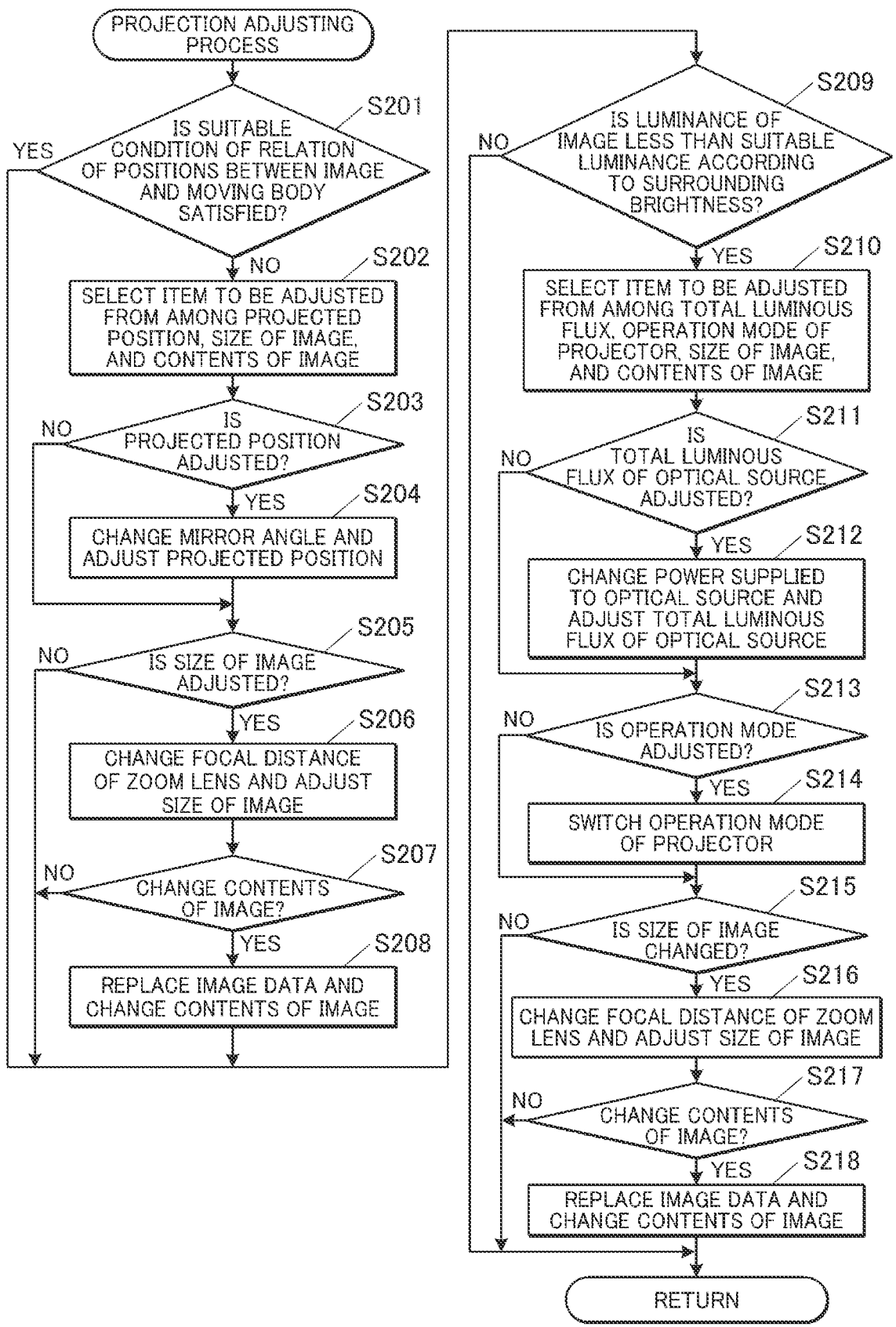
FIG. 14 is a flowchart showing a control procedure of a projection adjusting process.

FIG. 14 is a flowchart showing the control procedure of the projection adjusting process.

When the projection adjusting process is called, the CPU 11 determines whether the relation of the positions between the image 40 and the person P as the moving body satisfies the above-described suitable condition based on the moving body data 1331 (step S201). When it is determined that the suitable conditions are not satisfied ("NO" in step S201), the CPU 11 selects the items to be adjusted to satisfy the suitable conditions among the projected position of the image 40, the size of the image 40, and the contents of the image 40 based on the moving body data 1331 (step S202). Here, 1 item may be selected as the item of the adjusted target or 2 or more items may be selected. The contents of the image among the 3 items may be selected incidentally when changing the size of the image 40. The items that are targets of adjustment are selected so that the suitable conditions are satisfied as a result of an overall adjustment of the selected items based on the relation of the positions between the image 40 and the person P. For example, regarding the change of the relation of the positions between the image 40 and the person P, a first change by the adjustment of the projected position of the image 40 and a second change by the adjustment of the size of the image 40 are estimated. Then, the combination of the first change and the second change (at least one of the first change and the second change) that satisfies the suitable condition of the relation of the positions between the image 40 and the person P is specified. The items corresponding to the specified combination is selected as the item to be adjusted. As for the selection of the items, it is possible to consider whether the number of people P is less than a predetermined number.

The CPU 11 determines whether the projected position of the image 40 is selected as the item to be adjusted (step S203). When it is determined that the projected position of the image 40 is selected as the item to be adjusted ("YES" in step S203), the CPU 11 transmits the control signal to the mirror device 20, operates the mirror driver 24, and changes the angle of the mirror 25 (step S204). The CPU 11 changes the angle of the mirror 25 to adjust the projected position of the image 40 so that the shortest distance between the image 40 and the person P as the moving body increases. The CPU 11 adjusts the optical system of the image projector 14 and adjusts the focus of the image 40.

When the process in step S204 ends or when it is determined that the projected position of the image 40 is not selected as the item to be adjusted in step S203 ("NO" in step S203), the CPU 11 determines whether the size of the image 40 is selected as the item to be adjusted (step S205). When it is determined that the size of the image 40 is selected as the item to be adjusted ("YES" in step S205), the CPU 11 changes the focal distance of the zoom lens 147 and adjusts the size of the image 40 (step S206). The CPU 11 adjusts the optical system of the image projector 14 and adjusts the focus of the image 40. In step S206, normally, the image 40 is reduced so that the shortest distance between the image 40 and the person P as the moving body increases. For example, when the reduced image 40 (reduced image 40a) is displayed when the projection adjusting process starts, the image 40 may be enlarged. When the adjustment of the projected position is performed in step S204, depending on the relation of the positions between the projected position after adjustment and the person P, the image 40 may be adjusted to be enlarged to a degree so that the relation of the positions between the image 40 and the person P satisfies the above suitable conditions.

When step S206 ends, the CPU 11 determines whether the contents of the image 40 is selected as the item to be adjusted (step S207). When it is determined that the contents of the image 40 is selected as the item to be adjusted ("YES" in step S207), the CPU 11 replaces the image data supplied to the image projector 14 and changes the contents of the projected image 40 (step S208). In step S208, when the image 40 is reduced in step S206, the contents of the image 40 is changed so that the amount of information in the image 40 is reduced according to the reduction of the image 40. When the image 40 is enlarged in step S206, the contents of the image 40 can be changed so that the amount of information in the image 40 is increased according to the enlarging of the image 40.

When step S208 ends, when it is determined that the size of the image 40 is not selected as the item to be adjusted in step S205 ("NO" in step S205), when it is determined that the contents of the image 40 is not selected as the item to be adjusted in step S207 ("NO" in step S207), or it is determined that the suitable conditions are satisfied in step S201 ("YES" in step S201), the CPU 11 determines whether the luminance of the image 40 is less than the suitable luminance according to the brightness around the projected surface 2 (step S209). Here, the brightness around the projected surface 2 is specified from the brightness data 1332 generated in step S101. Alternatively, the brightness information is obtained again when step S209 is performed (brightness data 1332 is updated) and the surrounding brightness can be specified. The luminance of the image 40 can be specified from the imaged image obtained in step S105. Alternatively, the imaged image can be obtained again when step S209 is performed, and the luminance of the image 40 can be specified. Specifically, when the size of the image 40 is adjusted in step S206 and the luminance of the image 40 is changed according to the adjustment, preferably, the imaged image is obtained again when step S209 is performed again, and the luminance of the image 40 is specified. For example, the luminance of the image 40 can be specified by the method to convert the pixel value (tone value) of the imaged image to the luminance. The pixel value used in the conversion of the luminance may be the maximum value of the pixel value in the region corresponding to the image 40 in the imaged image, for example. The conversion from the pixel value to the luminance may be performed by a method in which table data in which the correspondence between the luminance specified based on the actual measured value of the luminance of the image 40 and the pixel value is recorded is referred, or a method in which the value is calculated according to a conversion formula generated in advance based on the relation of correspondence between the above luminance and the pixel value. The table data and the conversion formula may be determined according to the sensitivity of the imager 34 of the monitor device 30 or may be adjusted each time according to the change in the sensitivity of the imager 34.

When it is determined that the luminance of the image 40 is less than the suitable luminance according to the brightness around the projected surface 2 ("YES" in step S209), the CPU 11 selects the item to be adjusted in order to make the luminance of the image 40 to be a suitable luminance or more from the total luminous flux of the optical source 141, the operation mode of the image projector 14, the size of the image 40, and the contents of the image 40 based on the brightness data 1332 (surrounding brightness specified from the brightness data 1332) and the luminance of the image 40 (step S210). Here, 1 item may be selected as the item of the adjusted target or 2 or more items may be selected. The contents of the image among the 4 items may be selected incidentally when changing the size of the image 40. The item as the adjusted target is selected so that the luminance of the image 40 is to be a suitable luminance or more as a result of overall adjustment of the selected item based on suitable luminance according to the luminance of the image 40 and the surrounding brightness. For example, the combination of the first to third variation amount so that the luminance of the image 40 becomes the suitable luminance or more is specified based on the estimate of the first variation amount of the luminance of the image 40 by adjustment of the total luminous flux of the optical source 141, the estimate of the second variation amount of the luminance of the image 40 by the change of the operation mode of the image projector 14, and the estimate of the third variation amount of the luminance of the image 40 by adjustment of the size of the image 40. The item corresponding to the specified combination is selected as the item to be adjusted. According to another embodiment, the adjusted item regarding the luminance may be selected according to the contents of the image 40. For example, the adjusted item may be selected according to whether a predetermined information amount condition regarding how large the amount of information included in the image is satisfied. Here, the information amount condition may be considered to be satisfied when the number of letters included in the image is equal to or larger than a first threshold. Alternatively, the information amount condition can be considered to be satisfied when the number of colors in the image (or the number of tones of the image) is equal to or larger than a second threshold. Alternatively, the information amount condition may be considered to be satisfied when the photograph is included in the image. Alternatively, the information amount condition may be considered to be satisfied when two or more of the following occur, the number of letters included in the image is equal to or larger than a first threshold, the number of colors in the image is equal to or larger than a second threshold, and a photograph is included in the image. When the information amount condition is satisfied, the adjustment of the total luminous flux is selected with priority, and when the information amount condition is not satisfied, the operation mode of the image projector 14 or the size of the image 40 may be selected. When the adjusted item is selected based on an item other than the brightness data 1332 such as when the adjusted item is selected based on the contents of the image 40, after the adjusted item is selected, the adjusted contents of the adjusted items so that the luminance of the image 40 becomes a suitable luminance or larger are determined based on the brightness data 1332. After determining the adjusted contents of the adjusted items so that the luminance of the image 40 is the suitable luminance or larger based on the brightness data 1332, further, the adjusted item regarding the luminance can be selected based on the contents of the image 40 (information amount condition).

The CPU 11 determines whether the total luminous flux of the optical source 141 is selected as the item to be adjusted (step S211). When it is determined that the total luminous flux of the optical source 141 is selected as the item to be adjusted ("YES" in step S211), the CPU 11 changes the electric power supplied to the optical source 141 (driving current flown in the LD 1411 and the LED 1412), and the total luminous flux of the optical source 141 is adjusted (step S212). Here, normally, the total luminous flux of the optical source 141 is increased by increasing the supplied power. Alternatively, for example, when the luminance of the image 40 becomes too high due to the adjustment of the step S214 and/or step S216, adjustment may be performed so that the total luminous flux of the optical source 141 is reduced by reducing the supplied power.

When step S212 ends or when it is determined that the total luminous flux of the optical source 141 is not selected as the item to be adjusted in step S211 ("NO" in step S211), the CPU 11 determines whether the operation mode of the image projector 14 is selected as the item to be adjusted (step S213). When it is determined that the operation mode of the image projector 14 is selected as the item to be adjusted ("YES" in step S213), the CPU 11 switches the operation mode of the image projector 14 between the color priority mode and the luminance priority mode (step S214). Here, normally, the operation mode is switched from the color priority mode to the luminance priority mode. Alternatively, for example, when the operation mode is the luminance priority mode at the point when the projection adjusting process starts and the luminance of the image 40 becomes too high due to the adjustment in step S212 and/or step S216, the switch from the luminance priority mode to the color priority mode may be performed.

In step S213, the CPU 11 determines whether the suitable luminance can be obtained by the adjustment of the total luminous flux of the optical source 141 in step S212. When the suitable luminance cannot be obtained by only the adjustment of the total luminous flux (when the suitable luminous cannot be obtained even if the driving current value of the optical source 141 reaches the upper limit), the process may proceed to "YES" and the process in step S214 may be performed. In step S214 performed here, the operation mode of the image projector 14 switches from the color priority mode to the luminance priority mode so that the luminance of the image 40 increases. In step S213, in order to determine whether the suitable luminance can be obtained by adjusting the total luminous flux, the image 40 is imaged by the imager 34, and the luminance of the image 40 may be specified from the imaged image.

When the process in step S214 ends, or when it is determined that the operation mode of the image projector 14 is not selected as the item to be adjusted in step S213 ("NO" in step S213), the CPU 11 determines whether the size of the image 40 is selected as the item to be adjusted (step S215). When it is determined that the size of the image 40 is selected as the item to be adjusted ("YES" in step S215), the CPU 11 changes the focal distance of the zoom lens 147 and adjusts the size of the image 40 (step S216). The CPU 11 adjusts the optical system of the image projector 14 and adjusts the focus of the image 40. In step S216, normally, the image 40 is reduced so that the luminance of the image 40 increases. Alternatively, for example, when the luminance of the image 40 becomes too high due to the adjustment in step S212 and/or step S214, the image 40 may be enlarged so that the luminance of the image 40 decreases.

In step S215, the CPU 11 determines to which of the following first situation to third situation the situation applies. When it is determined that the situation applies to any one of the first to third situations, the process proceeds to "YES" and the process in step S216 is performed. The first situation is when the total luminous flux of the optical source 141 is selected but the operation mode of the image projector 14 is not selected as the item to be adjusted in step S210, the suitable luminance cannot be obtained by only adjusting the total luminous flux of the optical source 141 in step S212. The second situation is when the total luminous flux of the optical source 141 is not selected but the operation mode of image projector 14 is selected as the item to be adjusted in step S210, the suitable luminance cannot be obtained by only changing the operation mode of the image projector 14 in step S214. The third situation is when the total luminous flux of the optical source 141 and the operation mode of the image projector 14 are selected as the items to be adjusted in step S210, the suitable luminance cannot be obtained by adjusting the total luminous flux of the optical source 141 in step S212 and by changing the operation mode of the image projector 14 in step S214. In step S216 performed in the above situations, the image 40 is reduced so that the luminance of the image 40 is increased. In step S215, in order to determine whether the suitable luminance is obtained, the image 40 is imaged by the imager 34 and the luminance of the image 40 may be specified from the imaged image.

When the process in step S216 ends, the CPU 11 determines whether the contents of the image 40 is selected as the item to be adjusted (step S217). When it is determined that the contents of the image 40 is selected as the item to be adjusted ("YES" in step S217), the CPU 11 replaces the image data supplied to the image projector 14 and changes the contents of the projected image 40 (step S218). In step S218, when the image 40 is reduced in step S216, the contents of the image 40 is changed so that the amount of information of the image 40 is reduced according to the reduction. When the image 40 is enlarged in step S216, the contents of the image 40 may be changed so that the amount of information of the image 40 is increased according to the enlargement.

When the process in step S218 ends, when it is determined that the size of the image 40 is not selected as the item to be adjusted in step S215 ("NO" in step S215), when it is determined that the contents of the image 40 is not selected as the item to be adjusted in step S217 ("NO" in step S217) or when the luminance of the image 40 is not determined to be equal to or more than the suitable luminance in step S209 ("NO" in step S209), the CPU 11 ends the projection adjusting process, and returns the process to the image projecting process. At the point when the projection adjusting process ends, the relation of the positions between the image 40 and the person P satisfies the suitable condition and the luminance of the image 40 is equal to or more than the suitable luminance.

The order that the projected position of the image 40, the size of the image 40, and the contents of the image 40 are adjusted in steps S203 to S208 is not limited to the order shown in FIG. 14, and may be suitably interchanged or the adjustment of 2 or more items may be performed in parallel.

Moreover, the order that the total luminous flux of the optical source 141, the operation mode of the image projector 14, the size of the image 40, and the contents of the image 40 are adjusted in steps S211 to S218 is not limited to the order shown in FIG. 14, and may be suitably interchanged or the adjustment of 2 or more items may be performed in parallel.

For example, according to the projection adjusting process, control to change the size of the image 40 without changing the projected position of the image 40 may be performed. Moreover, control to adjust the luminance of the image 40 may be performed by adjusting the size of the image 40.

Returning to FIG. 13, when the projection adjusting process (step S107) ends, the CPU 11 determines whether the projection of the image 40 ends (step S108). Here, for example, when there is an instruction to end the projection of the image 40 from the operator of the projecting system 1, the CPU 11 determines that the projection of the image 40 is finished. When it is determined that the projection of the image 40 is not finished ("NO" in step S108), the CPU 11 returns the process to step S104. When it is determined that the projection of the image 40 is finished ("YES" in step S108), the CPU 11 ends the image projecting process.

The projection adjusting process shown in FIG. 14 is one example, and the various adjustment methods of the projected manner of the image 40 as described above may be suitably changed. For example, in the projection adjusting process, a step to adjust at least one of the projected position and the size of the image 40 may be provided in order to increase the smallest angle a between the travelling direction of the light in the image 40 and the direction toward the face of the person P. According to another embodiment, in the projection adjusting process, only the adjustment of the projected manner of the image based on the moving body information (step S201 to step S208) or only the adjustment of the projected manner of the image based on brightness information (and/or contents of the image 40) may be performed (step S209 to step S218). According to another embodiment, the adjustment of the projected manner of the image based on the brightness information (and/or contents of the image 40) may be performed before adjusting the projected manner of the image based on the moving body information.

(Modification 1)

Next, the modification 1 of the above embodiment is described. The present modification is different from the above embodiment in that the direction that the person P as the moving body moves is estimated and the projected position of the image is adjusted. Hereinbelow, the differences from the above embodiment are described and the description of the points that are common to the above embodiment are omitted.

Figure 15:
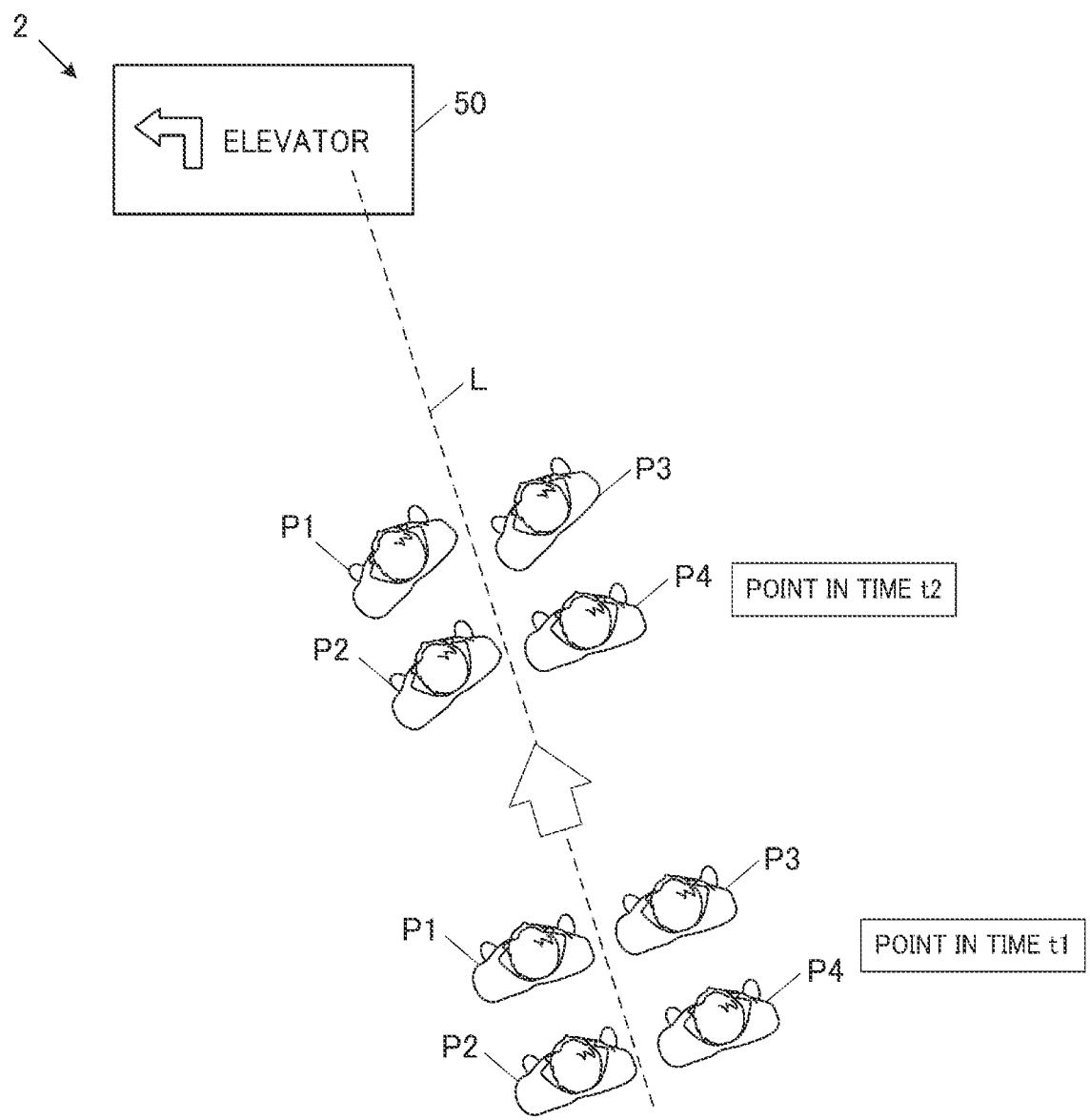
FIG. 15 is a diagram describing an operation of a projecting system according to modification 1.

FIG. 15 is a diagram describing the operation of the projecting system 1 according to modification 1.

According to the present modification, the imaging by the monitor device 30 is performed at 2 or more different points in time. For each point in time that the imaging is performed, the moving body information including the position of the person P as the moving body around the projected surface 2 and the direction that the face of the person P is facing is obtained based on the imaged image and the information is stored in the moving body data 1331. Then, based on the change in the position of the person P at each point in time, the travelling direction of the person P is estimated, and the projected position of the image is adjusted based on the estimated direction that the person P moves. The estimate of the direction that the person P moved may be performed by using the imaged image imaged by the plurality of monitor devices 30 provided in positions different from each other.

According to the example shown in FIG. 15, the positions of 4 people P1 to P4 and the directions that the faces are facing are specified based on the imaged image at point t1, the positions of the people P1 to P4 and the directions that the faces are facing are specified based on the imaged image at a point t2 later than point t1, and each specified result is stored in the moving body data 1331. An individual estimated line (not shown) showing the travelling direction estimated based on the change of positions from point t1 to point t2 is derived for each person P1 to P4. The individual estimated line may be a line that passes a first position of a person P at point t1 and a second position at point t2, and that extends in a direction from the first position to the second position. When the individual estimated lines are derived for 4 people, one estimated line L is derived representing the individual estimated lines for 4 people. The estimated line L can be derived by averaging the position of each individual estimated line (4 individual estimated lines in the present embodiment), for example. Alternatively, the line connecting the position representing the positions of the plurality of people P (people P1 to P4 in the present embodiment) at the point t1 and the position representing the positions of the plurality of people P (people P1 to P4 in the present embodiment) at the point t2 may be set as the estimated line L. Then, the projected position of the image 50 is adjusted so that the image 50 is projected in the position on the derived estimated line L. Here, the position on the estimated line L is the position overlapping with the estimated line L viewed from a vertical direction (vertical direction of a floor surface). The image 50 projected in the position on the estimated line L means that the estimated line L intersects with the projected range of the image 50 viewed from the vertical direction. According to the example shown in FIG. 15, the change in the positions between 2 points which are point t1 and point t2 is used. Alternatively, the travelling direction (individual estimated line and estimated line L) may be estimated based on the change in the positions of the person P in 3 or more points. The individual estimated line and the estimated line L in this case may be a curve. Alternatively, the projected position of the image 50 may be adjusted so that the image 50 is projected in the position on the individual estimated line of any one person.

The projected position of the image 50 may be adjusted so that the image 50 is easy to view based on the direction that the face of the person P is facing specified from the imaged image. For example, based on the newest imaged image (imaged image in point t2 in the example shown in FIG. 15), the projected position of the image 50 may be adjusted based on the direction that the face of the first person P in a group of people P is facing (when there are a plurality of people that are at the front, the average direction that the faces of the plurality of people are facing). In the example shown in FIG. 15, based on the situation that the directions that the faces of the person P1 and the person P3 positioned in the front of the group are facing is slightly to the left with relation to the estimated line L, the projected position of the image 50 is adjusted so that the center of the image 50 is positioned to the left than the estimated line L. Alternatively, the projected position of the image 50 may be adjusted based on only the direction that the face of the person P is facing without considering the estimated travelling direction of the person P.

Instead of the direction that the face of the person P is facing specified from the newest imaged image, the average of the directions that the face of the person P are facing specified from the plurality of imaged images at a plurality of different points may be used. Instead of the direction that the face of the person P is facing, the projected position of the image 50 may be adjusted based on the direction that the body of the person P is oriented (for example, normal direction of a straight line connecting both shoulders). Alternatively, when the image 50 is projected in order to guide the person P in a predetermined guiding direction, the projected position of the image adjusted based on the direction that the face of the person P is facing may be shifted to the guiding direction. With this, the person P is able to recognize the guiding direction more easily and intuitively.

Figure 16:
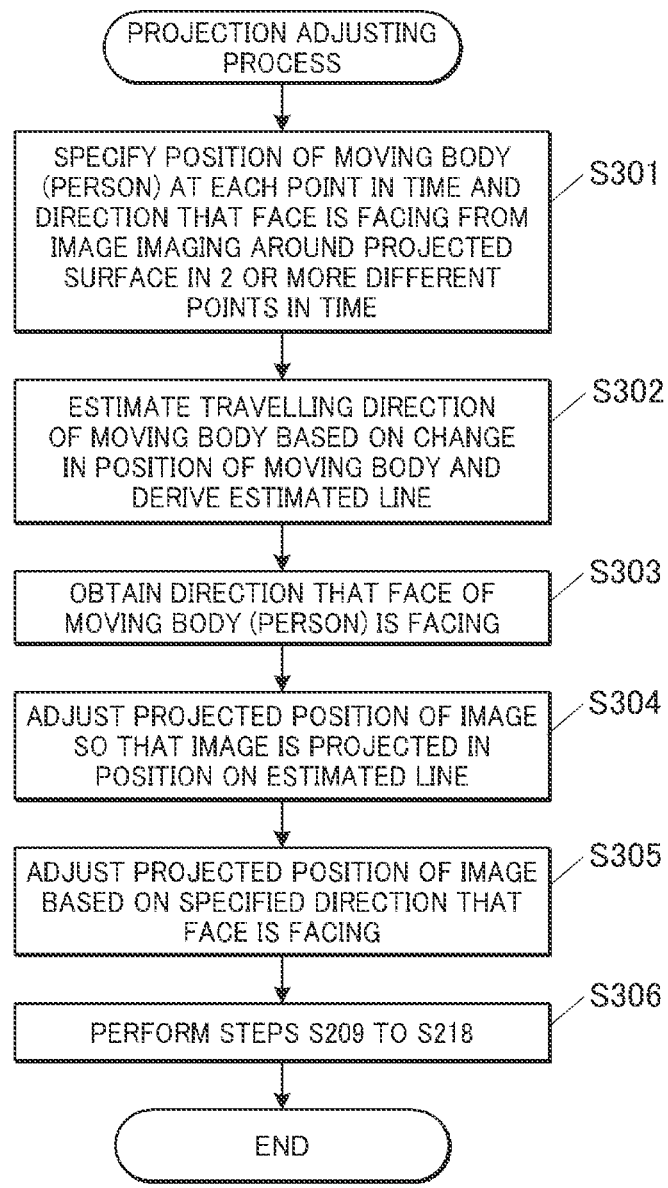
FIG. 16 is a flowchart showing a control procedure of a projection adjusting process according to modification 1.

FIG. 16 is a flowchart showing a control procedure of the projection adjusting process according to the modification 1.

When the projection adjusting process according to the modification 1 starts, the CPU 11 controls the monitor device 30 to image the image around the projected surface 2 at 2 or more different points in time. Then, the position of the person P as the moving body and the direction that the face is facing are specified for each point from the plurality of obtained images, and the specified result is stored in the moving body data 1331 (step S301). Alternatively, the imaging by the monitor device 30 may be performed periodically from before the start of the projection adjusting process, and the position of the person P and the direction that the face is facing may be specified based on the plurality of imaged images already imaged at the point that step S301 starts.

The CPU 11 refers to the moving body data 1331 and estimates the travelling direction of the person P around the projected surface 2 based on the change in the positions of the person P specified from the positions of the person P as the moving body in each of 2 or more different points (step S302). Here, the CPU 11 derives the individual estimated line showing the travelling direction of the person P, and when the people P form a group, the estimated line L of the group is derived based on the individual estimated lines L of the plurality of people P included in the group.

The CPU 11 obtains from the moving body data 1331 the direction that the face of the person P is facing for the person P that the travelling direction is estimated (step S303). When the plurality of people P form a group, the CPU 11 derives the direction that the face representing the plurality of people P is facing from the above method.

The CPU 11 adjusts the projected position of the image 50 so that the image 50 is projected in a position on the estimated line L derived in step S302 (step S304). The CPU 11 adjusts the projected position of the image 50 based on the direction that the face of the person P is facing obtained in step S303 (step S305). In steps S304 and S305, similar to step S204 in the projection adjusting process shown in FIG. 14, the CPU 11 transmits the control signal to the mirror device 20 and operates the mirror driver 24, and the angle of the mirror 25 is changed. With this, the projected position of the image 50 is adjusted. The CPU 11 adjusts the optical system of the image projector 14 and adjusts the focus of the image 50. The adjustment in steps S304 and S305 do not have to be performed separately, and the adjustment shown in steps S304 and S305 may be performed collectively based on the estimated line L and the direction that the face is facing.

In steps S304 and S305, in addition to the adjustment of the projected position of the image 50, the direction of the image 50 may be adjusted. Alternatively, similar to step S206 in the projection adjusting process shown in FIG. 14, the focal distance of the zoom lens 147 may be changed, and the size of the image 50 may be adjusted. Similar to step S208 in the projection adjusting process shown in FIG. 14, the image data supplied to the image projector 14 is replaced and the contents of the projected image 50 may be changed.

When the adjustment in step S305 ends, the CPU 11 performs steps S209 to S218 of the projection adjusting process shown in FIG. 14 (step S306). That is, based on the relation between the luminance of the image 50 and the brightness of the surroundings (and/or the contents of the image 40), the CPU 11 performs the adjustment of the total luminous flux of the optical source 141 (step S212), the switching of the operation modes of the image projector 14 (step S214), the adjustment of the size of the image 50 by changing the focal distance of the zoom lens 147 (step S216), and the changing of the contents of the image 50 (step S218).

When the process in step S306 ends, the CPU 11 ends the projection adjusting process.

(Modification 2)

Next, the modification 2 of the above embodiment is described. The present modification is different from the above embodiment in that at least one of the contents of the image, projected position and direction is adjusted based on the position of the person P as the moving body and the direction that the person P is facing and the time that the image is projected. Hereinbelow, the differences from the above embodiment are described and the description of the points that are common to the above embodiment are omitted. The modification 2 may be combined with modification 1.

Figure 17:
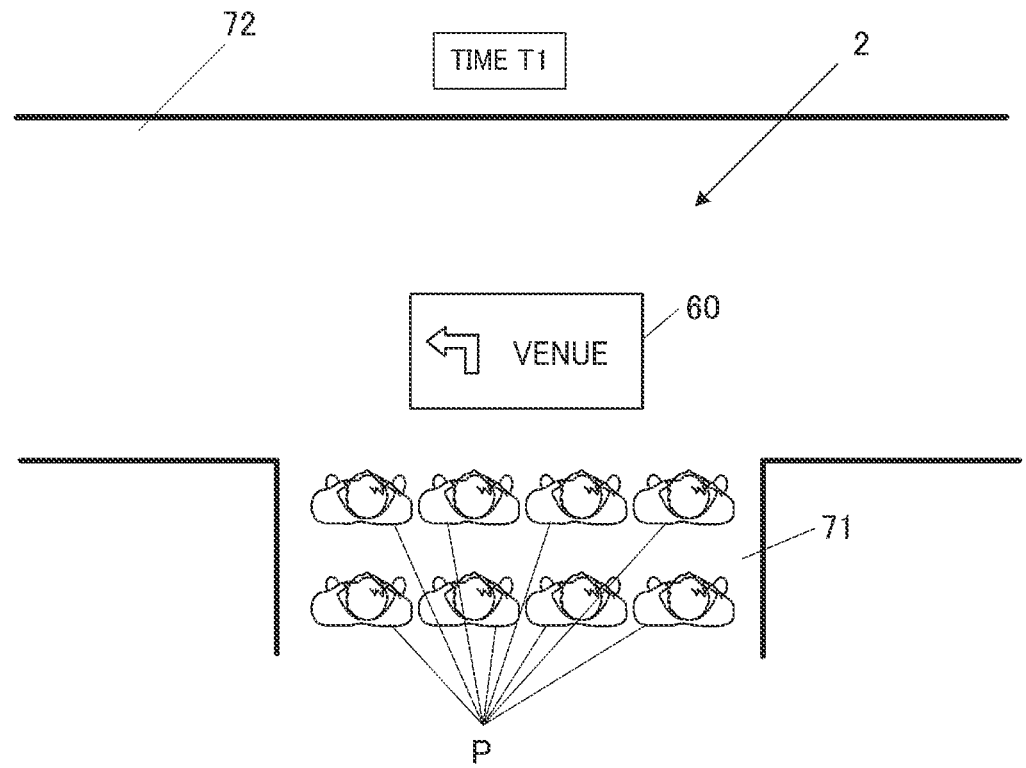
FIG. 17 is a diagram describing an operation of a projecting system according to modification 2.
Figure 18:
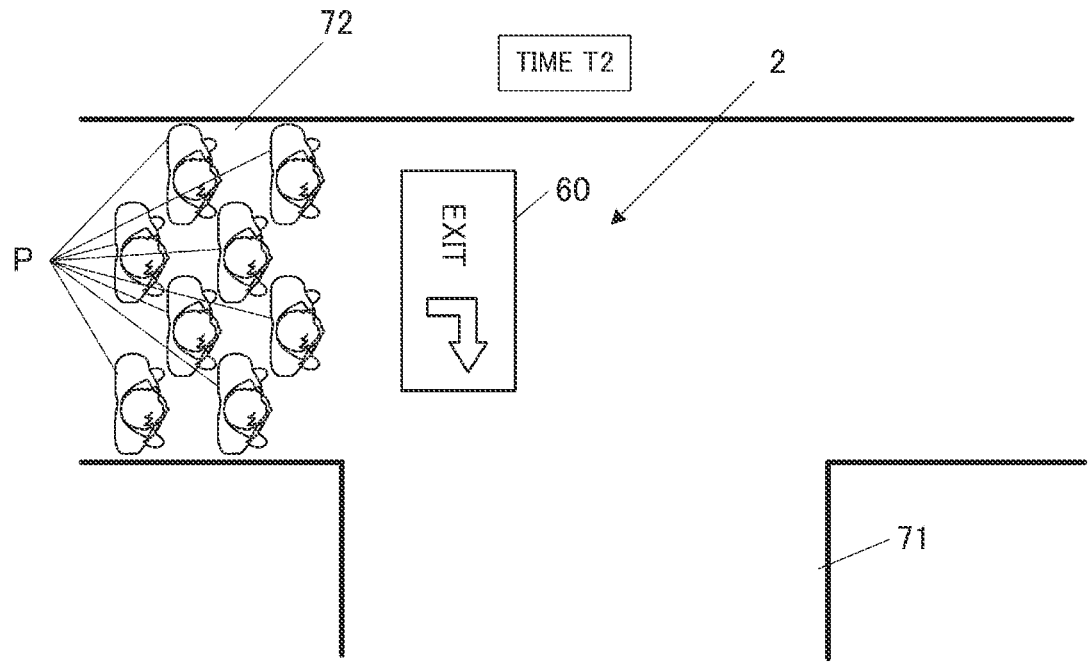
FIG. 18 is a diagram describing an operation of a projecting system according to modification 2.

FIG. 17 and FIG. 18 are diagrams describing the operation of the projecting system 1 according to the modification 2.

In the present modification, the moving body information including the position of the person P as the moving body around the projected surface 2 and the direction that the person P is facing is obtained based on the imaged image imaged by the monitor device 30, and the information is stored in the moving body data 1331. Then, based on the obtained position of the person P and the direction that the person P is facing, and the time that the image 60 is projected, the image 60 with the contents suitable for that time is projected in the position according to the position and the direction of the person P. The time can be obtained by various known methods. For example, a timekeeping circuit that measures and holds the present time by measuring the signal with the predetermined frequency dividing the clock signal may be provided in the projector 10, and the CPU 11 may obtain the time from such timekeeping circuit.

For example, FIG. 17 shows a situation at the time T1 before a certain event starts. The plurality of people P are moving through an aisle 71 heading toward a venue of the event in order to participate in the event. The people P go to the venue of the event by making a left at the end of the aisle 71 and then going straight down the aisle 72. In such situation, the CPU 11 projects the image 60 on the floor surface (projected surface 2) in front of the plurality of people P based on the positions of the plurality of people P and the directions that the plurality of people P are facing. The CPU 11 projects the image 60 including the contents to guide the plurality of people P to the venue of the event (here, an image to urge to take a left at the aisle 72) based on the situation that the time T1 that the image 60 is projected is the time before the event starts.

FIG. 18 shows a situation in which the plurality of people P who left the venue of the event and who are heading toward the exit of the facility at the time T2 after the event ends are moving through the aisle 72. The people P head to the exit of the facility by turning right at the aisle 72 to enter the aisle 71 and going straight down the aisle 71. In such situation, based on the positions of the plurality of people P and the directions that the people P are facing, the CPU 11 projects the image 60 in front of the plurality of people P. That is, the CPU 11 changes the projected position of the image 60 from the floor surface of the aisle 71 in front of the people P as shown in FIG. 17 to the floor surface of the aisle 72 in front of the people P shown in FIG. 18, and the direction of the image 60 is rotated 90 degrees in the clockwise direction from the direction shown in FIG. 17. The CPU 11 projects the image 60 (here, the image urging the person P to turn right toward the aisle 71) including the contents to guide the plurality of people P to the exit based on the situation that the time T2 that the image 60 is projected is the time after the event ends.

Figure 19:
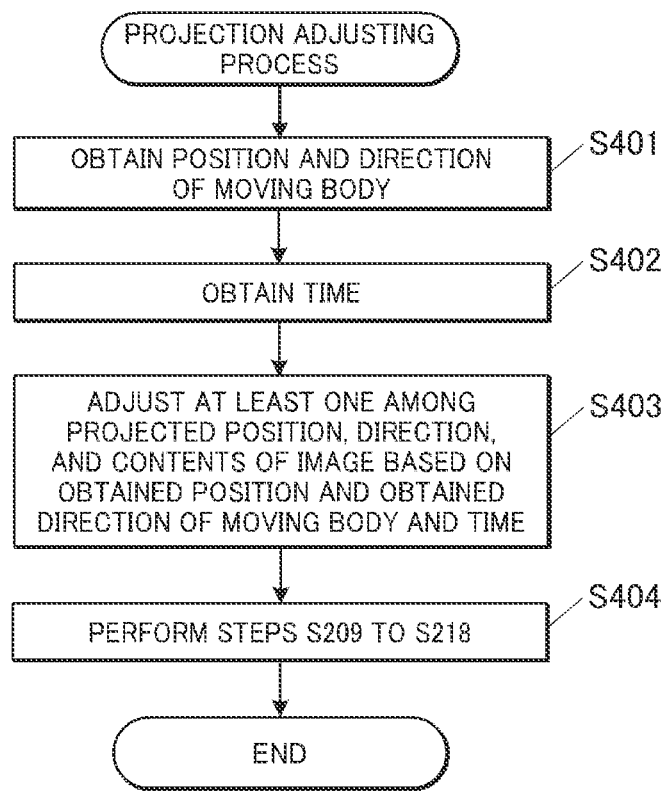
FIG. 19 is a flowchart showing a control procedure of a projection adjusting process according to modification 2.

FIG. 19 is a flowchart showing the control procedure of the projection adjusting process regarding the modification 2.

When the projection adjusting process according to the modification 2 starts, the CPU 11 obtains the position of the person P as the moving body around the projected surface 2 and the direction that the person P is facing from the moving body data 1331 (step S401). When the person P forms a group, the average of the positions of the plurality of people P included in the group and the directions that the people P are facing may be derived. The CPU 11 obtains the present time (step S402).

The CPU 11 adjusts at least one among the projected position, direction, and the contents of the image 60 based on the obtained position of the person P as the moving body, the obtained direction that the person P is facing, and the obtained time (step S403). When the projected position of the image 60 is adjusted, similar to step S204 of the projection adjusting process shown in FIG. 14, the CPU 11 transmits the control signal to the mirror device 20, operates the mirror driver 24, and changes the angle of the mirror 25. With this, the projected position of the image 60 is adjusted. For example, the direction of the image 60 can be adjusted by performing an image process that rotates and converts the image data of the image 60 according to the amount that the direction of the image 60 is changed (for example, 90 degrees), for example. Alternatively, the projector 10 and the mirror 25 may be a configuration that can be rotated with relation to where the above are attached (the ceiling according to the present embodiment), and the direction of the image 60 can be adjusted by rotating the projector 10 and the mirror 25 in the angle according to the change in the direction of the image 60. The CPU 11 adjusts the optical system of the image projector 14 and adjusts the focus of the image 60. When the contents of the image 60 is changed, similar to step S208 in the projection adjusting process shown in FIG. 14, the CPU 11 replaces the image data supplied to the image projector 14 and changes the contents of the projected image 60.

When the adjustment in step S403 ends, the CPU 11 performs steps S209 to S218 of the projection adjusting process shown in FIG. 14 (step S404). That is, based on the relation between the luminance of the image 60 and the surrounding brightness (and/or the contents of the image 40), the CPU 11 performs the adjustment of the total luminous flux of the optical source 141 (step S212), the switching of the operation mode of the image projector 14 (step S214), the adjustment of the size of the image 60 by changing the focal distance of the zoom lens 147 (step S216), and the changing of the contents of the image 60 (step S218).

When step S404 ends, the CPU 11 ends the projection adjusting process.

The projection adjusting process shown in FIG. 16 and FIG. 19 is one example.

For example, in FIG. 16, the adjustment of the projected manner of the image based on the brightness information (and/or contents of image 40) (step S306) may be performed before steps S301 to S305 or only steps S301 to S305 may be performed. In the projection adjusting process shown in FIG. 16, at least part of the process in steps S201 to S208 as shown in FIG. 14 may also be performed. For example, when it is determined that the relation of the positions of the image 40 and the person P (relation of the positions based on the present position of the person P or the relation of the positions based on the estimated position of the person P in the estimated travelling direction) do not satisfy the suitable condition ("NO" in step S201), by changing the angle of the mirror 25, at least one of following processes is performed, the process to adjust the projected position of the image 40 so that the shortest distance between the image 40 and the person P increases (shortest distance based on the present position or the shortest distance based on the estimated position) (step S204) and the process to adjust the size of the image 40 so that the shortest distance between the image 40 and the person P increases (shortest distance based on the present position or the shortest distance based on the estimated position) (step S206).

In FIG. 19, the adjustment of the projected manner of the image based on the brightness information (and/or contents of the image 40) (step S404) may be performed before steps S401 to S403 or only steps S401 to S403 may be performed. In the projection adjusting process shown in FIG. 19, at least part of the process in steps S201 to S208 as shown in FIG. 14 may also be performed. For example, when it is determined that the relation of the positions between the image 40 and the person P do not satisfy the suitable condition ("NO" in step S201), at least one of the following processes may be performed, the process to adjust the projected position of the image 40 so that the shortest distance between the image 40 and the person P increases by changing the angle of the mirror 25 (step S204) and the process to adjust the size of the image 40 so that the shortest distance between the image 40 and the person P increases (step S206).

<Effect>

As described above, the projected system 1 according to the present embodiment includes an optical source 141, an image projector 14 that projects the image 40 on a projected surface 2, and a CPU 11 as a processor. The CPU 11 obtains the brightness data 1332 (brightness information) regarding the brightness around the projected surface 2, selects at least one item among the total luminous flux of the optical source 141, the color gamut of the image 40 and the size of the image 40, and adjusts the selected item based on the brightness data 1332. With this, the projected manner of the image 40 can be flexibly adjusted according to the brightness around the projected surface 2. Therefore, the image 40 can be projected in a manner that can be viewed more easily, and the information can be notified in a manner that is easier to understand by projecting the image 40.

The CPU 11 selects at least one item among the total luminous flux of the optical source 141, the color gamut of the image 40 and the size of the image 40, and adjusts the selected item so that the luminance of the image 40 increases as the brightness around the projected surface 2 specified from the brightness data 1332 increases. This can reduce the problem that the visibility of the image 40 decreases due to the surroundings of the projected surface 2 becoming bright.

The image projector 14 uses the combination of light in 3 different colors output from the optical source 141 and projects the image 40. The CPU 11 controls the image projector 14 and the image projector 14 can be operated between the color priority mode (first mode) that uses light in 1 color among the 3 colors at any point in time during the projection of the image 40 and the luminance priority mode (second mode) that uses 2 colors among the 3 colors of light at the same time in at least a part of a period during the projection of the image 40 and that sets the maximum value of the luminance of the image 40 to be higher than the color priority mode. When the selected item is the color gamut of the image 40, the color gamut of the image 40 is adjusted by control switching the operation mode of the image projector 14 between the color priority mode and the luminance priority mode. With this, the color gamut of the image 40 can be adjusted by easy control switching the display mode. According to the change in the color gamut, the luminance of the image 40 can be adjusted so that the luminance is decreased according to the increase in the color gamut. Therefore, the luminance of the image 40 can be increased without increasing the total luminous flux of the optical source 141 (the power supplied to the optical source 141).

The light in 3 colors are the red light, the green light, and the blue light. The period that the image projector 14 operates in the luminance priority mode includes the period using the red light and the green light at the same time and the period using the red light and the blue light at the same time. With this, the luminance priority mode can be performed in the projector 10 provided with the hybrid optical source 141 including the blue color LD 1411 and the red color LED 1412.

The CPU 11 further obtains the moving body data 1331 (moving body information) regarding the person P as the moving body around the projected surface 2. Based on the obtained moving body data 1331, at least one of the projected position of the image 40 and the size of the image 40 is adjusted so that the shortest distance between the image 40 and the person P around the projected surface 2 increases. This can reduce the problem such as the image 40 and the person P overlapping and the image 40 becoming difficult to view.

According to the modification 1, the CPU 11 further obtains the moving body data 1331 (moving body information) regarding the person P as the moving body around the projected surface 2. The moving body data 1331 includes the information regarding the position of the person around the projected surface 2 in 2 or more different points in time. The CPU 11 estimates the travelling direction of the person P around the projected surface 2 based on the change in the positions of the person P around the projected surface 2 specified from the obtained moving body data 1331. The projected position of the image 50 is adjusted based on the estimated travelling direction. With this, the image 50 can be projected in the suitable position according to the state that the person P moves. Therefore, the person P is able to easily acknowledge the contents of the image 50.

According to modification 1, the CPU 11 further obtains the moving body data 1331 (moving body information) regarding the person P as the moving body around the projected surface 2. The moving body data 1331 includes information regarding the position of the person P around the projected surface 2 and the direction that the face of the person P is facing. The CPU 11 adjusts the projected position of the image 50 based on the direction that the face of the person P is facing specified from the obtained moving body data 1331. According to the above, the image 50 can be projected in a position that can be easily viewed by the person P.

According to the modification 2, the CPU 11 further obtains the moving body data 1331 (moving body information) regarding the person P as the moving body around the projected surface 2. The moving body data 1331 includes the information regarding the position of the person P around the projected surface 2 and the direction that the person P is facing. The CPU 11 adjusts at least one of the projected position, the direction, and the contents of the image 60 based on the position of the person P and the direction that the person P is facing specified from the obtained moving body data 1331 and the time that the image 60 is projected. With this, the image 60 including the contents suitable for a certain time can be projected in the position suitable according to the position of the person P and the direction that the person P is facing.

The projecting system 1 includes a mirror 25 that reflects the light that is output from the image projector 14 and that is included in the image 40 and guides the light onto the projected surface 2. The mirror 25 is provided so that the angle of the surface that reflects the light can be changed. The CPU 11 adjusts the projected position of the image 40 according to control to change the angle of the surface of the mirror 25 that reflects the light. With this, the projected position of the image 40 can be adjusted by easy control and an operation within a small movable range so as to change the angle of the mirror 25.

The image projector 14 includes a zoom lens 147 that guides the light included in the image 40 in the predetermined direction and that is capable of adjusting the focal distance. When the size of the image 40 is the selected item, the CPU 11 adjusts the size of the image 40 by control that changes the focal distance of the zoom lens 147. With this, the size of the image 40 can be adjusted by simple control which is to change the focal distance of the zoom lens 147. According to the change in the size of the image 40, the luminance of the image 40 can be adjusted so that the luminance increases as the image 40 becomes smaller. Therefore, by increasing the focal distance of the zoom lens 147, the size of the image 40 is reduced so that the distance between the image 40 and the person P is large, and the luminance of the image 40 is increased so as to be able to increase the visibility.

When the size of the image 40 is the selected item and the size of the image 40 is changed, the CPU 11 changes the contents of the image 40 so that the amount of information included in the image 40 is reduced according to the reduction of the size of the image 40. With this, even if the image 40 is reduced, the information can be notified to be easier to understand by projecting the image 40.

The CPU 11 changes the color gamut of the image 40 according to the contents of the image 40. With this, when the simple image 40 in which the information regarding color is not important is projected, operation to maintain the luminance of the image 40 is possible by projection in the luminance priority mode in which the color gamut is small and the luminance is high. Therefore, the image 40 can be projected in a manner that can be viewed more easily, and the information can be notified in a manner that is easier to understand by projecting the image 40.

When it is judged whether the information amount condition regarding how large the amount of information included in the image 40 is satisfied, and it is determined that the information amount condition is satisfied, the CPU 11 adjusts the total luminous flux of the optical source 141. When it is determined that the information amount condition is not satisfied, at least one of the color gamut of the image 40 and the size of the image 40 is adjusted. With this, when the amount of information included in the image 40 is large, by adjusting the total luminous flux of the optical source 141, the image 40 can be adjusted to be a suitable brightness while maintaining the ease to understand the information. When the amount of information included in the image 40 is large, by adjusting at least one of the color gamut of the image 40 and the size of the image 40, the brightness of the image 40 can be adjusted with more flexibility.

The projecting method according to the present embodiment is a projecting method that is performed by the CPU 11 as the computer of the projecting system 1. The brightness data 1332 (brightness information) regarding the brightness around the projected surface 2 is obtained, at least one item among the total luminous flux of the optical source 141, the color gamut of the image 40 and the size of the image 40 is selected, and the selected item is adjusted based on the brightness data 1332. With this, the projected manner of the image 40 can be flexibly adjusted according to the brightness around the projected surface 2. Therefore, the image 40 can be projected in a manner that can be viewed more easily, and the information can be notified in a manner that is easier to understand by projecting the image 40.

The storage 13 according to the present embodiment (non-transitory computer-readable storage medium) stores the program 131 that can be performed by the CPU 11 as the processor of the projecting system 1. According to the program 131, the CPU 11 obtains the brightness data 1332 (brightness information) regarding the brightness around the projected surface 2, selects at least one item from among the total luminous flux of the optical source 141, the color gamut of the image 40, and the size of the image 40, and adjusts the selected item based on the brightness data 1332. With this, the projected manner of the image 40 can be flexibly adjusted according to the brightness around the projected surface 2. Therefore, the image 40 can be projected in a manner that can be viewed more easily, and the information can be notified in a manner that is easier to understand by projecting the image 40.

<Others>

The description of the above embodiments describe one example of the information processing apparatus, storage medium, and information processing method of the present invention, and the invention is not limited to the above.

For example, the CPU 11 of the projector 10 is described as the example of the processor, and the operation of the mirror device 20 and the monitor device 30 is controlled by the CPU 11 but the configuration is not limited to the above. For example, a processor can be provided in an information processing device (for example, personal computer) separate from the projector 10, and the processor may control the projector 10, the mirror device 20, and the monitor device 30. The processor may be provided in the mirror device 20 or the monitor device 30. According to another embodiment, at least one processor among the plurality of processors may be provided in the information processing apparatus different from the projector 10. In this case, the processor includes at least one processor provided in the projector 10 and at least one processor provided in the information processing apparatus. The image projector 14 is not limited to the above-described embodiments. For example, the configuration may include at least one type of optical source, a rotating color wheel and phosphors so as to emit light in the colors of RGB. The image projector 14 may be a part of a liquid crystal type projector that emits light in the colors of RGB using an optical source and a liquid crystal panel.

When the optical system that can adjust the projected position of the image 40 is provided inside the projector 10, or when the adjustment mechanism to adjust the direction of the projector 10 according to control by the CPU 11 is provided and the projected position of the image 40 can be adjusted by adjusting the direction of the projector 10 with the adjusting mechanism, the mirror device 20 is omitted and the image 40 is projected directly on the projected surface 2 from the projector 10.

The configuration of the monitor device 30 can be included in the projector 10 and the monitor device 30 can be omitted.

As the adjustment of the projected manner of the image 40, adjustment of the projected position, the luminance, the size, and the contents of the image 40 are described but the items are not limited to the above. Any projected manner can be adjusted according to the environment information, examples including the direction, resolution, frame rate, and the like of the image 40.

As the environment information, the moving body information and the brightness information are described as examples, but the environment information is not limited to the above. The environment information may include any information regarding the environment around the projected surface 2, examples including, weather, temperature, humidity, and the like.

According to the above embodiment, the person P as the moving body is described as the example, but the moving body is not limited to the above. For example, the moving body may be a robot or a car.

According to the above description, the storage 13 is used as the computer readable medium but the configuration is not limited to the above. Other computer readable storage media such as an HDD, SSD, flash memory, CD-ROM, and the like can be applied as the information recording medium.

The detailed configuration and the detailed operation of the components of the projector 10, the mirror device 20, and the monitor device 30 according to the present embodiment can be suitably changed without leaving the scope of the present invention.

Although various embodiments of the present invention are described above, the scope of the present invention is not limited to the above described embodiments, and include the scope of the attached claims and its equivalents.

What is claimed is:

1. A projecting system comprising:
   an image projector that includes an optical source and that projects an image on a projected surface; and
   a processor,
   wherein the processor obtains brightness information regarding brightness around the projected surface,
   wherein the processor selects at least one item among a total luminous flux of the optical source, a color gamut of the image, and a size of the image, and
   wherein the processor adjusts the item that is selected based on the brightness information.

2. The projecting system according to claim 1, wherein the processor selects at least one item from among the total luminous flux of the optical source, the color gamut of the image, and the size of the image, and adjusts the selected item so that luminance of the image increases according to increase of the brightness around the projected surface specified from the brightness information.

3. The projecting system according to claim 1, wherein the image projector projects the image using a combination of light in three different colors output from the optical source,
   wherein the processor is configured to be capable of operating the image projector in a first mode that uses one color of light among the three colors of light in any point during projection of the image and a second mode in which two colors of light among the three colors of light are used at the same time in at least one part of a period during the projection of the image and in which a maximum value of the luminance of the image is higher than that of the first mode; and
   wherein in the case that the selected item is the color gamut of the image, the processor adjusts the color gamut of the image by control in which the operation mode of the image projector is switched between the first mode and the second mode.

4. The projecting system according to claim 2, wherein the image projector projects the image using a combination of light in three different colors output from the optical source,
   wherein the processor is configured to be capable of operating the image projector in a first mode that uses one color of light among the three colors of light in any point during projection of the image and a second mode in which two colors of light among the three colors of light are used at the same time in at least one part of a period during the projection of the image and in which a maximum value of the luminance of the image is higher than that of the first mode; and
   wherein in the case that the selected item is the color gamut of the image, the processor adjusts the color gamut of the image by controlling the operation mode of the image projector to be switched between the first mode and the second mode.

5. The projecting system according to claim 3,
   wherein the light in three colors are red light, green light, and blue light, and wherein a period in which the image projector is operating in the second mode includes a period in which the red light and the green light are used at the same time and a period in which the red light and the blue light are used at the same time.

6. The projecting system according to claim 4,
wherein the light in three colors are red light, green light, and blue light, and
wherein a period in which the image projector is operating in the second mode includes a period in which the red light and the green light are used at the same time and a period in which the red light and the blue light are used at the same time.

7. The projecting system according to claim 1,
wherein the processor further obtains moving body information regarding a moving body around the projected surface, and
wherein, based on the obtained moving body information, the processor adjusts at least one of the projected position of the image and the size of the image so as to increase a shortest distance between the image and a moving body around the projected surface.

8. The projecting system according to claim 1,
wherein the processor further obtains moving body information regarding a moving body around the projected surface,
wherein the moving body information includes information regarding a position of a moving body around the projected surface in two or more different points in time,
wherein the processor estimates a travelling direction of a moving body around the projected surface based on a change of position of the moving body around the projected surface specified from the obtained moving body information, and
wherein the processor adjusts the projected position of the image based on the estimated travelling direction.

9. The projecting system according to claim 1,
wherein the processor further obtains moving body information regarding a moving body around the projected surface,
wherein the moving body is a person,
wherein the moving body information includes information regarding a position of a person around the projected surface and a direction that a face of the person is facing, and
wherein the processor adjusts the projected position of the image based on the direction that the face of the person is facing specified from the obtained moving body information.

10. The projecting system according to claim 1,
wherein the processor further obtains moving body information regarding a moving body around the projected surface,
wherein the moving body information includes information regarding a position of a moving body around the projected surface and a direction that the moving body is facing, and
wherein the processor adjusts at least one among the projected position, a direction, and contents of the image based on the position and the direction of the moving body specified from the obtained moving body information and the time that the image is projected.

11. The projecting system according to claim 7, further comprising a mirror that reflects light that is emitted from the image projector and that is included in the image and guides the light to the projected surface,
wherein the mirror is provided to be configured to be able to change an angle of a surface that reflects the light, and
wherein the processor adjusts the projected position of the image by controlling and changing the angle of the surface of the mirror that reflects the light.

12. The projecting system according to claim 1,
wherein the image projector includes a zoom lens that guides the light included in the image in a predetermined direction and that is able to adjust a focal distance, and
wherein the processor adjusts the size of the image by control of changing the focal distance of the zoom lens in the case that the size of the image is the selected item.

13. The projecting system according to claim 1, wherein the processor changes contents of the image to decrease an amount of information included in the image according to a decrease of the size of the image in the case that the selected item is the size of the image and the size of the image is changed.

14. The projecting system according to claim 1, wherein the processor changes the color gamut of the image according to contents of the image.

15. The projecting system according to claim 1,
wherein the processor determines whether an information amount condition regarding how large an amount of information included in the image is satisfied,
wherein the processor adjusts the total luminous flux of the optical source in the case that it is determined that the information amount condition is satisfied, and
wherein the processor adjusts at least one of the color gamut of the image and the size of the image in the case that it is determined that the information amount condition is not satisfied.

16. The projecting system according to claim 2,
wherein the processor determines whether an information amount condition regarding how large an amount of information included in the image is satisfied,
wherein the processor adjusts the total luminous flux of the optical source in the case that it is determined that the information amount condition is satisfied, and
wherein the processor adjusts at least one of the color gamut of the image and the size of the image in the case that it is determined that the information amount condition is not satisfied.

17. The projecting system according to claim 3,
wherein the processor determines whether an information amount condition regarding how large an amount of information included in the image is satisfied,
wherein the processor adjusts the total luminous flux of the optical source in the case that it is determined that the information amount condition is satisfied, and
wherein the processor adjusts at least one of the color gamut of the image and the size of the image in the case that it is determined that the information amount condition is not satisfied.

18. The projecting system according to claim 4,
wherein the processor determines whether an information amount condition regarding how large an amount of information included in the image is satisfied,
wherein the processor adjusts the total luminous flux of the optical source in the case that it is determined that the information amount condition is satisfied, and wherein the processor adjusts at least one of the color gamut of the image and the size of the image in the case that it is determined that the information amount condition is not satisfied.

19. A projecting method that is performed by a computer in a projecting system including an image projector that includes an optical source and that projects an image on a projected surface, the method comprising,
   obtaining brightness information regarding brightness around the projected surface,
   selecting at least one item among a total luminous flux of the optical source, a color gamut of the image, and a size of the image, and
   adjusting the item that is selected based on the brightness information.

20. A non-transitory computer readable storage medium having a program stored thereon that can be executed by a processor of a projecting system including an image projector that includes an optical source and that projects an image on a projected surface, wherein the program controls the processor to perform:
   obtaining brightness information regarding brightness around the projected surface,
   selecting at least one item among a total luminous flux of the optical source, a color gamut of the image, and a size of the image, and
   adjusting the item that is selected based on the brightness information.

* * * * *